US012125235B1

(12) United States Patent
Penfield et al.

(10) Patent No.: US 12,125,235 B1
(45) Date of Patent: Oct. 22, 2024

(54) SYSTEM AND METHOD FOR ERGONOMIC RISK ASSESSMENT BASED ON THREE DIMENSIONAL MOTION CAPTURE DATASETS

(71) Applicant: VelocityEHS Holdings Inc., Chicago, IL (US)

(72) Inventors: Julia Penfield, Seattle, WA (US); Leyang Wen, Ann Arbor, MI (US); Veeru Talreja, Morgantown, WV (US); Daeho Kim, Toronto (CA); Meiyin Liu, New Brunswick, NJ (US); Richard Thomas Barker, West Chester, OH (US); SangHyun Lee, Ann Arbor, MI (US)

(73) Assignee: VelocityEHS Holdings Inc., Chicago, IL (US)

( * ) Notice: Subject to any disclaimer, the term of this patent is extended or adjusted under 35 U.S.C. 154(b) by 0 days.

(21) Appl. No.: 18/417,633

(22) Filed: Jan. 19, 2024

(51) Int. Cl.
  *G06T 7/70* (2017.01)
  *G06T 5/70* (2024.01)
  (Continued)

(52) U.S. Cl.
  CPC ............... *G06T 7/70* (2017.01); *G06T 5/70* (2024.01); *G06T 7/20* (2013.01); *G06V 20/70* (2022.01);
  (Continued)

(58) Field of Classification Search
  CPC .... G06T 7/70; G06T 5/70; G06T 7/20; G06T 2207/30204; G06T 2207/30241; G06V 20/70; G06V 2201/07
  See application file for complete search history.

(56) References Cited

U.S. PATENT DOCUMENTS

2003/0215130 A1*  11/2003  Nakamura .............. G06T 7/251
                                                        382/154
2013/0188017 A1*  7/2013  Ma .......................... G06T 7/246
                                                        348/46

FOREIGN PATENT DOCUMENTS

JP  2005345161 A  * 12/2005
JP  2016209212 A  * 12/2016

OTHER PUBLICATIONS

Dzeng et al. "Automated Posture Assessment for Construction Workers." 40th International Convention on Information and Communication Technology, Electronics and Microelectronics (MIPRO), May 22, 2017, pp. 1027-1031 (Year: 2017).*

(Continued)

*Primary Examiner* — Jon Chang
(74) *Attorney, Agent, or Firm* — K&L Gates LLP

(57) ABSTRACT

Disclosed herein is a system and method for obtaining and generating motion capture datasets relating to various working activities for ergonomic risk assessment. An example system may comprise a computing device that obtains first data from multiple motion capture cameras, obtains second data from multiple visible light imaging sensors, calculates 3D positions of multiple reflective markers positioned on several subjects performing various working activities based on the first data, labels each marker to generate marker trajectories, performs gap filing and smoothing functions on the marker trajectories to generate global marker positions, transforms the global marker positions into a corresponding image coordinate system of each sensor to generate 3D pose data of the subjects at each sensor viewpoint, projects the 3D pose data into frames of the second data to generate 2D pose data, and generates a dataset comprising the second data, the 2D pose data, and the 3D pose data.

20 Claims, 11 Drawing Sheets
(9 of 11 Drawing Sheet(s) Filed in Color)

(51) Int. Cl.
*G06T 7/20* (2017.01)
*G06V 20/70* (2022.01)

(52) U.S. Cl.
CPC .......... *G06T 2207/30204* (2013.01); *G06T 2207/30241* (2013.01); *G06V 2201/07* (2022.01)

(56) References Cited

OTHER PUBLICATIONS

Gu et al. "3D Limb Movement Tracking and Analysis for Neurological Dysfunctions of Neonates Using Multi-Camera Videos." 38th Annual International Conference of the IEEE Engineering in Medicine and Biology Society (EMBC), Aug. 16, 2016, pp. 2395-2398 (Year: 2016).*
Ionescu et al., Human3.6M: Large Scale Datasets and Predictive Methods for 3D Human Sensing in Natural Environments. IEEE Trans Pattern Anal Mach Intell. Jul. 2014;36(7):1325-39.

* cited by examiner

| Participant # | Gender | BMI | BMI Category |
|---|---|---|---|
| #1 | Men | 17.53 | Underweight |
| #2 | Men | 21.22 | Healthy weight |
| #3 | Men | 24.16 | Healthy weight |
| #4 | Men | 24.68 | Healthy weight |
| #5 | Men | 32.23 | Overweight/obese |
| #6 | Women | 17.79 | Underweight |
| #7 | Women | 18.87 | Healthy weight |
| #8 | Women | 20.72 | Healthy weight |
| #9 | Women | 21.41 | Healthy weight |
| #10 | Women | 26.43 | Overweight/obese |

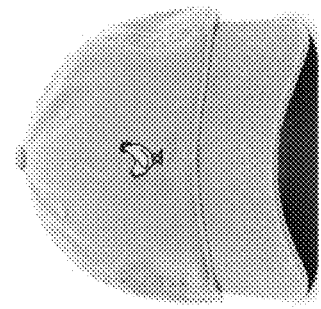
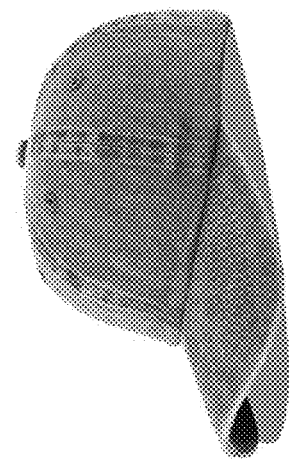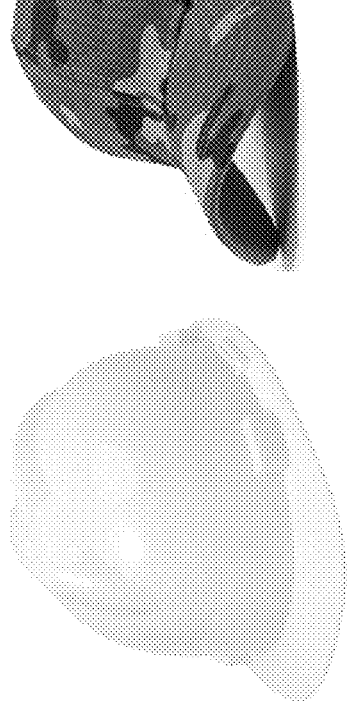
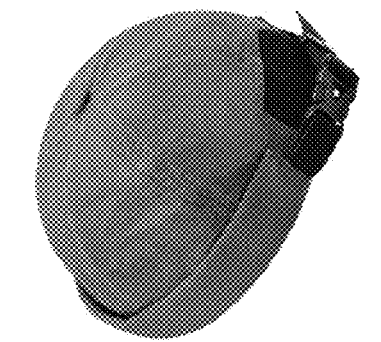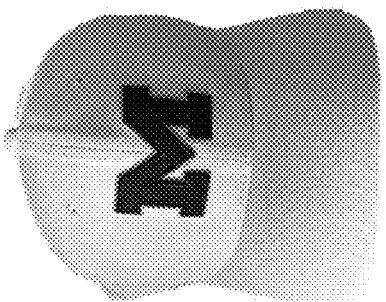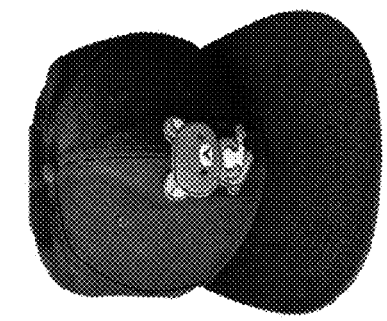
FIG. 7(A) FIG. 7(B) FIG. 7(C) FIG. 7(D) FIG. 7(E) FIG. 7(F) FIG. 7(G) FIG. 7(H) FIG. 7(I)

| Body Joints | Angles of Interest in Industrial Ergonomics |
|---|---|
| Neck | Flexion/extension + lateral bend + rotation |
| Shoulder | Flexion/extension + horizontal abduction/adduction + rotation |
| Elbow | Flexion |
| Wrist | Flexion/extension + deviation + rotation |
| Back | Flexion/extension + lateral flexion/extension + rotation |
| Knee | Flexion |

FIG. 9

SYSTEM AND METHOD FOR ERGONOMIC RISK ASSESSMENT BASED ON THREE DIMENSIONAL MOTION CAPTURE DATASETS

FIELD OF TECHNOLOGY

The present disclosure generally relates to a system and method for identifying and assessing ergonomic risks at workplaces, and more particularly relates to a system and method configured to obtain and generate three dimensional (3D) motion capture datasets for ergonomic risk assessment.

BACKGROUND

Work-related musculoskeletal disorders (WMSDs) are common injuries for workers in labor-intensive industries like manufacturing, warehouse, and construction. WMSDs are often caused by repeated awkward postures, invariable work, and forceful exertions. In many instances, WMSDs can lead to persistent pain or even disability if left untreated. Therefore, it is critical for workers to identify and correct their ergonomically risky postures in a timely manner before WMSDs develop. However, identifying such postures is a demanding task. Current practices often include intermittent visits from ergonomic specialists who briefly observe workers carrying out tasks. Due to its labor-intensive and time-consuming nature, such methods are restricted to infrequent deployment and cannot provide timely interventions to correct workers' postures.

Recent developments in vision-based human pose estimation have made it possible to develop automatic ergonomic risk assessment tools that allow continuous awkward posture detection using an ordinary video camera. For example, some applications may utilize machine-learning models to estimate workers' 2D and/or 3D joint locations from video and image frames. These joint locations may be used to calculate joint angles and perform an ergonomic risk analysis. However, currently available datasets may not be suitable or sufficient for ergonomic analysis in an industrial setting. For example, simplified skeleton representations of human activities used in the available datasets lack essential keypoints information needed for calculating intricate ergonomic angles such as wrist rotations. Consequently, machine learning models trained on such datasets face limitations in conducting comprehensive ergonomic analyses, as they lack complete access to joint angles. Moreover, the generic motions portrayed in such datasets may deviate significantly from the customary manual tasks executed within industrial settings, thereby compromising the 3D pose estimation performance of a trained machine learning model when deployed in such environments.

Accordingly, there is a need for an advanced computer vision and machine learning based system and method for obtaining and generating motion capture datasets relating to various working activities for ergonomic risk assessment.

SUMMARY

Among other features, the present disclosure provides a system for obtaining and generating motion capture datasets relating to various working activities for ergonomic risk assessment. For example, the system may include a plurality of reflective markers positioned on selected key body surface locations of each of a number of subjects; a set of motion capture cameras placed in first selected locations of an area to detect signals from the plurality of reflective markers in order to track movements of the number of subjects in the area; and a set of visible light imaging sensors placed in second selected locations of the area to obtain 2D information of the number of subjects moving in the area.

The system may comprise a computing device having a non-transitory computer-readable storage medium storing instructions; and a processor coupled to the non-transitory computer-readable storage medium. The processor is configured to execute the instructions to: obtain first data from the set of motion capture cameras, obtain second data from the set of visible light imaging sensors, calculate 3D positions of each of the plurality of reflective markers based at least upon the first data, generate an auto-labeling template to label each of the plurality of reflective markers identified in the first data, inspect labelled first and second data frame-by-frame by cross referencing the first data with the second data in order to generate marker trajectories, identify occluded reflective markers based at least on the marker trajectories, perform gap filing to determine positions of the occluded reflective markers, apply a smoothing filter to the marker trajectories to remove high-frequency noises in order to generate global marker positions, transform the global marker positions into a corresponding image coordinate system of each visible light imaging sensor to generate 3D pose data of the number of subjects at each sensor viewpoint, project the 3D pose data into frames of the second data in order to generate 2D pose data of the number of subjects, and generate a dataset comprising the second data, the 2D pose data, and the 3D pose data.

In one aspect, locations of the plurality of reflective markers may be determined to capture pose information of a plurality of body portions of each of the number of subjects for calculating ergonomic angles of interest in an industrial ergonomic context, wherein the plurality of body portions include a neck portion, a shoulder portion, an elbow portion, a wrist potion, a back portion and a knee portion.

In another aspect, the angles of interest of the neck portion may include neck flexion/extension, lateral bend, and rotation, the angles of interest of the shoulder portion include shoulder flexion/extension, horizontal abduction/adduction, and rotation, the angles of interest of the elbow portion include a first flexion angle, the angles of interest of the wrist portion include wrist flexion/extension, deviation, and rotation, the angles of interest of the back portion include back flexion/extension, lateral flexion/extension, and rotation, and the angles of interest of the knee portion include a second flexion angle.

In an embodiment, the first and second data may relate to motions of the number of subjects performing each of a plurality of working activities for a selected duration of time. For example, the plurality of working activities may include a series of warm-up activities, poking, pushing/pulling a cart, carrying objects horizontally, lifting objects, unboxing boxes, assembling with back bending, assembling with knee bending, and assembling overhead.

In some implementations, the processor of the computing device may be configured to calculate the 3D positions of each reflective marker based at least upon the first data using triangulation, and generate the auto-labeling template by at least recording motion capture data of one of the subjects bending all body joints to their full extent in all degrees of freedom.

In other embodiments, the processor may be configured to perform the gap filing to determine the positions of the occluded reflective markers by at least using temporal information from each occluded reflective marker and positional information from surrounding reflective markers.

The processor of the computing device may be further configured to execute the instructions to collect 3D positional data and orientation data of each visible light imaging sensor during a calibration procedure preceding every motion capture session. Moreover, a number of parameters relating to each visible light imaging sensor may be collected during the calibration procedure such as a focal length, a skew coefficient, a pixel aspect ratio, radical distortion parameters, and a principle point and distortion center.

In yet another embodiment, the processor of the computing device may be configured to transform the global marker positions into the local coordinate system of the set of visible light imaging sensors based at least upon the 3D positional data and orientation data of each visible light imaging sensor, and generate the 2D pose data based at least upon the number of parameters.

In accordance with other aspects, the present disclosure relates to a method, comprising: positioning a plurality of reflective markers on selected key body surface locations of each of a number of subjects; placing a set of motion capture cameras in first selected locations of an area to detect signals from the plurality of reflective markers in order to track movements of the number of subjects in the area; placing a set of visible light imaging sensors in second selected locations of the area to obtain 2D information of the number of subjects moving in the area.

The method may additionally comprise obtaining, by a processor of a computing device, first data from the set of motion capture cameras; obtaining, by the processor, second data from the set of visible light imaging sensors; calculating 3D positions of each of the plurality of reflective markers based at least upon the first data; generating an auto-labeling template to label each of the plurality of reflective markers identified in the first data; inspecting labelled first and second data frame-by-frame by cross referencing the first data with the second data in order to generate marker trajectories; identifying occluded reflective markers based at least on the marker trajectories; performing gap filing to determine positions of the occluded reflective markers; applying a smoothing filter to the marker trajectories to remove high-frequency noises in order to generate global marker positions; transforming the global marker positions into a corresponding image coordinate system of each visible light imaging sensor to generate 3D pose data of the number of subjects at each sensor viewpoint; projecting the 3D pose data into frames of the second data in order to generate 2D pose data of the number of subjects; and generating a dataset comprising the second data, the 2D pose data, and the 3D pose data.

According to an embodiment, the method may further comprise determining locations of the plurality of reflective markers in order to capture pose information of a plurality of body portions of each of the number of subjects for calculating ergonomic angles of interest in an industrial ergonomic context, wherein the plurality of body portions include a neck portion, a shoulder portion, an elbow portion, a wrist potion, a back portion and a knee portion.

In one aspect, the angles of interest of the neck portion may include neck flexion/extension, lateral bend, and rotation, the angles of interest of the shoulder portion include shoulder flexion/extension, horizontal abduction/adduction, and rotation, the angles of interest of the elbow portion include a first flexion angle, the angles of interest of the wrist portion include wrist flexion/extension, deviation, and rotation, the angles of interest of the back portion include back flexion/extension, lateral flexion/extension, and rotation, and the angles of interest of the knee portion include a second flexion angle.

In one aspect, the first and second data may relate to motions of the number of subjects performing each of a plurality of working activities for a selected duration of time, wherein the plurality of working activities include a series of warm-up activities, poking, pushing/pulling a cart, carrying objects horizontally, lifting objects, unboxing boxes, assembling with back bending, assembling with knee bending, and assembling overhead.

In one embodiment, the calculating the 3D positions of each reflective marker may comprise triangulating the first data, and generating the auto-labeling template comprises recording motion capture data of one of the subjects bending all body joints to their full extent in all degrees of freedom. Further, performing the gap filing may include determining the positions of the occluded reflective markers by at least using temporal information from each occluded reflective marker and positional information from surrounding reflective markers.

In one aspect, the method may further comprise collecting 3D positional data and orientation data of each visible light imaging sensor during a calibration procedure of the set of visible light imaging sensors preceding every motion capture session. Moreover, the method may also include collecting a number of parameters relating to each visible light imaging sensor during the calibration procedure, the number of parameters including a focal length, a skew coefficient, a pixel aspect ratio, radical distortion parameters, and a principle point and distortion center.

In some embodiments, transforming the global marker positions into the local coordinate system of the set of visible light imaging sensors may be based at least upon the 3D positional data and orientation data of each visible light imaging sensor, and generating the 2D pose data may be based at least upon the number of parameters.

The above simplified summary of example aspects serves to provide an understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are incorporated into and constitute a part of this specification, illustrate one or more example aspects of the present disclosure and, together with the detailed description, serve to explain their principles and implementations.

FIG. 7(A) illustrates a protective hard hat worn by a participant, according to an exemplary aspect of the present disclosure;

FIGS. 7(B), 7(C), 7(D), 7(E), 7(F), 7(G), 7(H), and 7(I) illustrate eight baseball caps of varying colors and design patterns worn by participants, according to an exemplary aspect of the present disclosure;

FIG. 9 illustrates target ergonomic angles of interest of a number of identified body portions, according to an exemplary aspect of the present disclosure;

DETAILED DESCRIPTION

Figure 1:
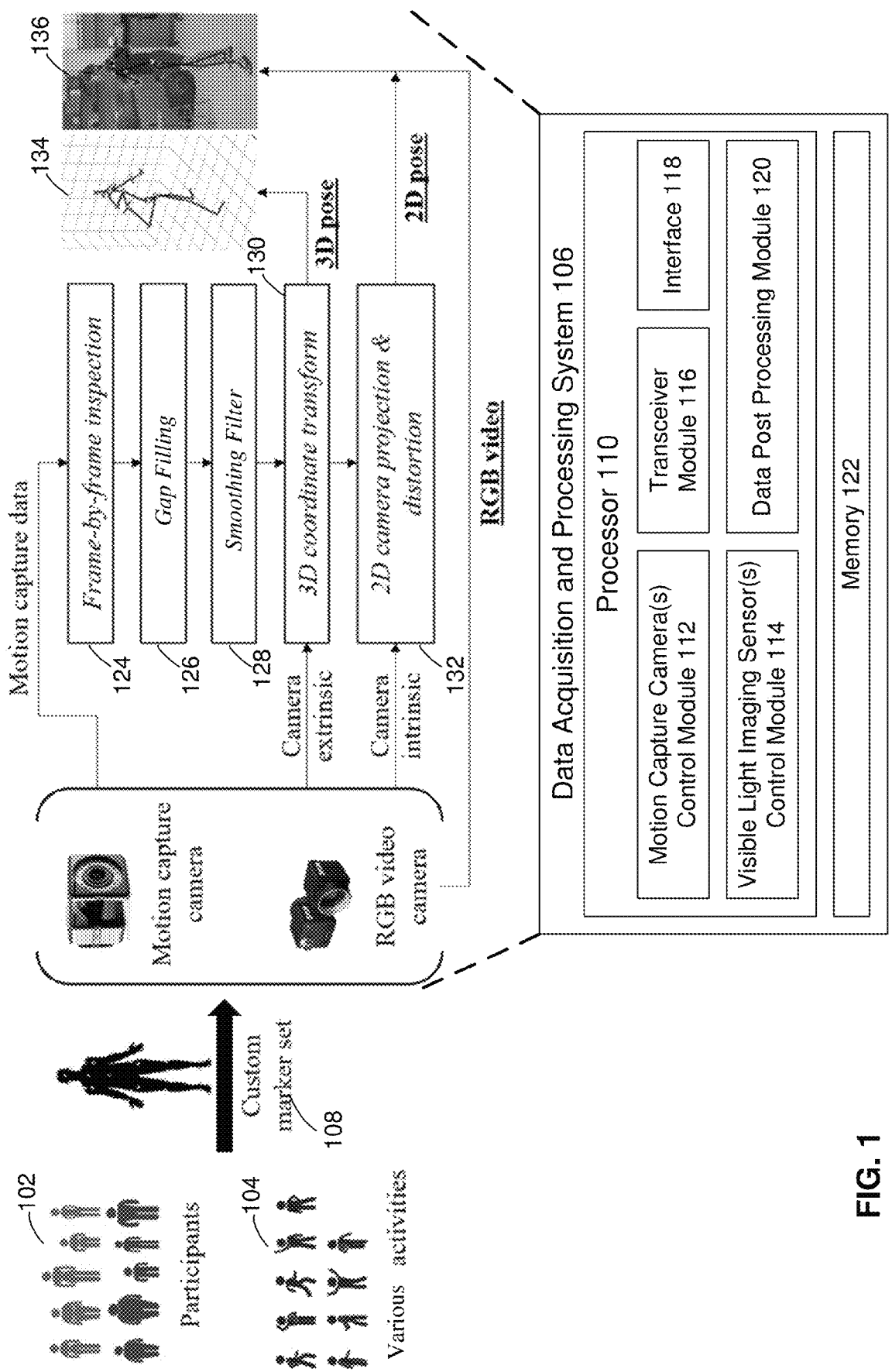
FIG. 1 illustrates a diagram of a computing system for obtaining and generating motion capture datasets relating to various working activities for ergonomic risk assessment, according to an exemplary aspect of the present disclosure.

Various aspects of the present disclosure will be described with reference to the drawings, wherein like reference numerals are used to refer to like elements throughout. In the following description, for purposes of explanation, numerous specific details are set forth in order to promote a thorough understanding of one or more aspects of the present disclosure. It may be evident in some or all instances, however, that any aspects described below can be practiced without adopting the specific design details described below.

Among other features, the present disclosure relates to an advanced computer vision and machine learning based computing system configured to generate a large 3D human pose dataset including at least, e.g., 6.48 million image frames with the corresponding 2D and 3D human pose annotation using a millimeter-accurate motion capturing system. As shown in FIG. 1, in one embodiment, a number of participants 102 with a wide spectrum of body shapes were recruited to perform various distinct working activities 104, including lifting, carrying, pushing, pulling, unboxing, and assembling in a motion capture chamber that is controlled by a data acquisition and processing system 106, in accordance with aspects of the present disclosure. Before the start of each motion capture session, a number of reflective markers may be strategically positioned on key body surface locations of each participant. In certain aspects, the marker locations of the custom marker set 108 are selected to ensure that sufficient information is captured for calculating ergonomic angles of interest in an industrial ergonomic context.

In some example implementations, the data acquisition and processing system 106 may include at least one processor 110 configured to control and execute a plurality of modules including a motion capture camera(s) control module 112, a visible light imaging sensor(s) control module 114, a transceiver module 116, an interface 118, and a data post processing module 120. The term "module" as used herein refers to a real-world device, component, or arrangement of components and circuitries implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special purpose device. A module may also be implemented as a combination of the two, with certain functions facilitated by hardware alone, and other functions facilitated by a combination of hardware and software. Each module may be realized in a variety of suitable configurations, and should not be limited to any example implementation exemplified herein.

Memory 122, which is coupled to the processor 110, may be configured to store at least a portion of information obtained by the data acquisition and processing system 106. In one aspect, memory 122 may be a non-transitory machine readable medium configured to store at least one set of data structures or instructions (e.g., software) embodying or utilized by at least one of the techniques or functions described herein. It should be appreciated that the term "non-transitory machine readable medium" may include a single medium or multiple media (e.g., one or more caches) configured to store at least one instruction. The term "machine readable medium" may include any medium that is capable of storing, encoding, or carrying instructions for execution by all modules of the system 106 and that cause these modules to perform at least one of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

Figure 2:
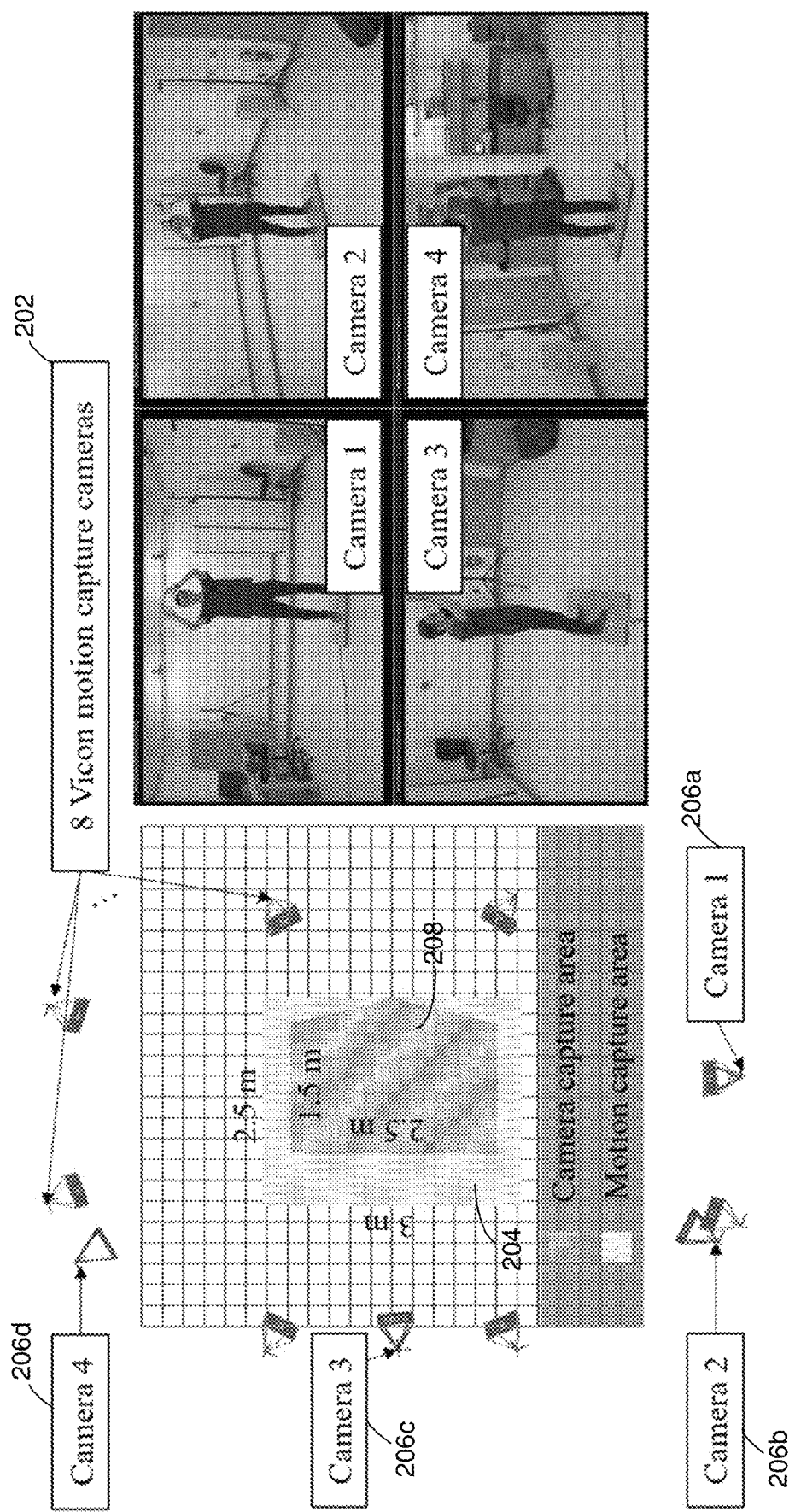
FIG. 2 illustrates an example setup of a motion capture and camera data acquisition system of the computing system of FIG. 1, according to an exemplary aspect of the present disclosure.

In one embodiment, the motion capture camera(s) control module 112 may be configured to control a set of motion capture cameras (e.g., eight Vicon® optical motion capture cameras 202) positioned at selected locations of the motion capture chamber, as shown in FIG. 2. The motion capture cameras may be evenly distributed on wall railings in all directions to maximize coverage area, each at approximately 2.7 meters high. These motion capture cameras may be configured to effectively triangulate and track the 3D locations of reflective markers in a 3 m×2.5 m motion capture area 204 with millimeter-level accuracy. It should be appreciated that the number and type of motion capture cameras and each specific placement within the motion capture chamber may be determined and implemented in accordance with any desirable accuracy and use case.

The visible light imaging sensor(s) control module 114 may be configured to control a set of video cameras (e.g., four FLIR® red green and blue (RGB) video cameras 206a, 206b, 206c, and 206d) also positioned at selected locations of the motion capture chamber, as shown in FIG. 2. For example, the four RGB video cameras 206a, 206b, 206c, and 206d may be positioned on tripods and wall railings, each offering a distinct viewing angle and creating an effective RGB capture area 208 of 2.5 m×1.5 m. Within this area 208, each participant may be asked to move around and face different directions while executing various working activities. This setup ensures comprehensive coverage of camera viewing angles and allows participants to perform motions with more global movements. The set of RGB cameras 206a, 206b, 206c, and 206d may be positioned at varying heights: one at chest level (~1.5 m), one at eye level (~1.7 m), one positioned slightly above head height (~2.2 m), and the last one set to a surveillance camera's vantage point (~2.7 m). This arrangement may allow the obtained dataset to encompass videos with a diverse range of camera pitch angles and match the common use scenarios in an industrial setting. It should be appreciated that the number and type of visible light imaging sensor(s) and each specific placement within the motion capture chamber may be determined and implemented in accordance with any desirable accuracy and use case.

Referring back to FIG. 1, the transceiver module 116 of the data acquisition and processing system 106 may be configured by the processor 110 to exchange various information and data with other modules and/or computing devices connected with the system 106. In one aspect, the transceiver module 116 transmits the motion capture data obtained by the motion capture camera(s) control module 112 to the data post processing module 120 such that the data may be correctly labeled and inspected 124 and cleaned frame by frame using, e.g., gap filing 126 and smoothing filter 128 (e.g., Vicon® gap-filling functions and Woltring filter). Data relating to the cleaned 3D pose may be subsequently transformed 130 by the data pose processing module 120 into respective RGB camera coordinate systems and projected 132 onto the four camera planes using camera calibration information. As a result, 3D poses 134 and 2D human poses 136 may be generated based at least upon the corresponding RGB video obtained by the visible light imaging sensor(s) control module 114.

The data acquisition and processing system 106 may also include an interface 118 configured to allow a user to control and access different modules and computing devices connected with the system 106. Various information relating to the control and the processing of data may be presented to the user via the interface 118 which may include any suitable graphical user interface, command line interface, menu-driven user interface, touch user interface, voice user interface, form-based user interface, natural language user interface, and mobile user interface (e.g., graphical and touch-sensitive display features associated with mobile computing devices such as smartphones and tables).

Figure 3:
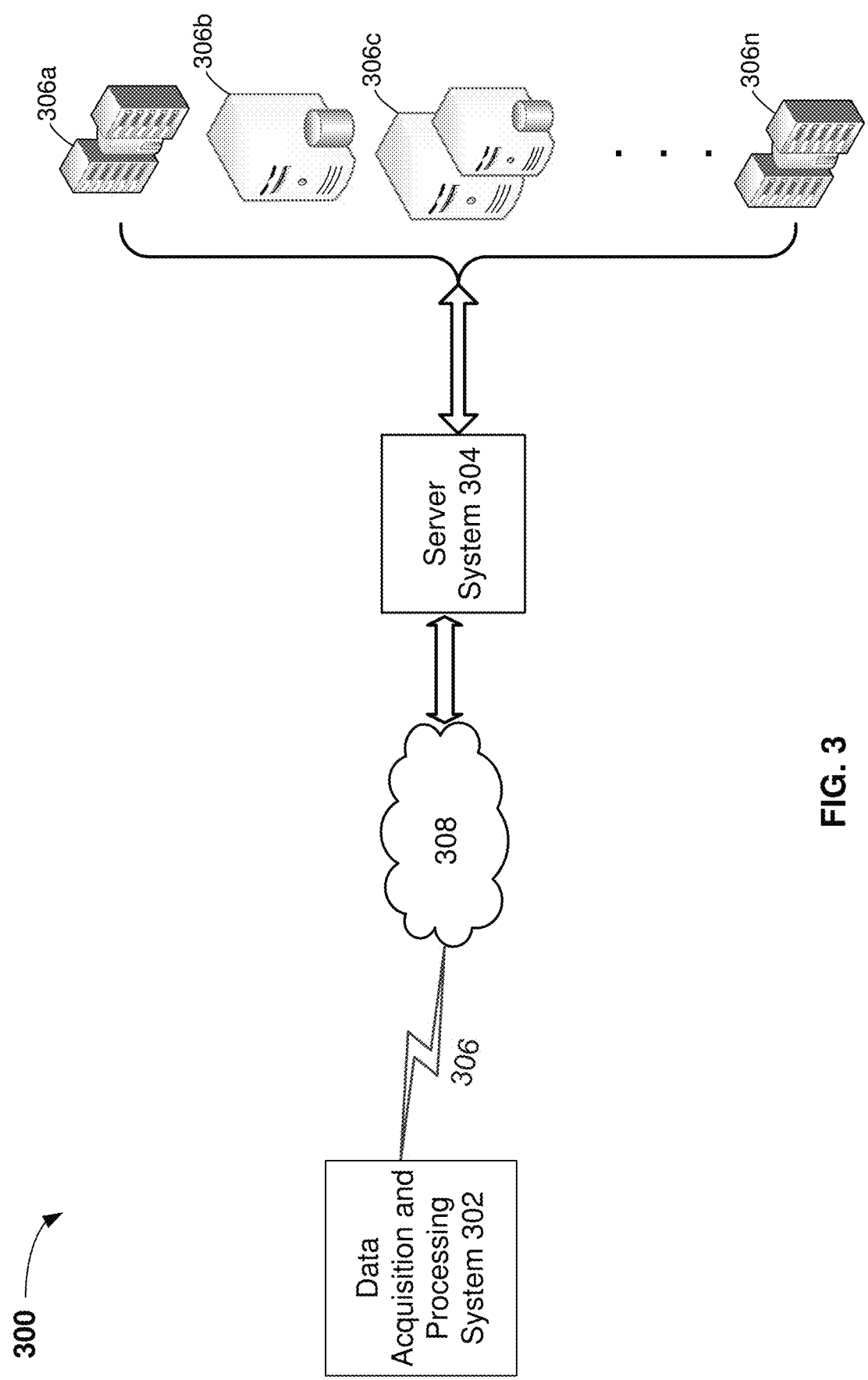
FIG. 3 illustrates a server-based architecture of a computing system for obtaining and generating motion capture datasets relating to various working activities for ergonomic risk assessment, according to an exemplary aspect of the present disclosure.

Referring to FIG. 3, a computing system 300 deployed within a server-based computing environment and communication network may be configured to generate a large 3D human pose dataset, in accordance with another embodiment of the present disclosure. A data acquisition and processing system 302, which includes modules similar to at least some modules of the system 106 of FIG. 1, may access a server system 304 via any suitable communication protocol 306 and network 308. The server system 304 may be configured to use advanced computer vision, machine learning, deep learning, and/or artificial intelligence technology to process the data obtained by the acquisition and processing system 302 for generating a large 3D human pose dataset in order to train specialized human pose estimation models with an ergonomic focus. For example, the server system may analyze data related to ergonomic risks and derive insights and recommendations by applying machine learning methods, such as classification, regression, clustering, or anomaly detection, to identify groups, trends, correlations, or outliers in the data.

Further, different machine learning models may be used for human pose estimation. A kinematic model, also called the skeleton-based model, may be used for 2D and 3D pose estimation. This model may generate a set of joint positions and limb orientations to represent the human body structure. Such skeleton pose estimation models may be used to capture the relations between different body parts. In another example, a planar model, or contour-based model, may be used for 2D pose estimation. Such planar models may be used to represent the appearance and shape of a human body. For example, body parts may be represented by multiple rectangles approximating the human body contours. A popular example is the Active Shape Model (ASM), which is used to capture the full human body graph and the silhouette deformations using principal component analysis. In yet another example, a volumetric model may be used for 3D pose estimation.

The data acquisition and processing system 302 may include various data capture devices to monitor a group of participants with a wide spectrum of body shapes recruited to perform working activities including lifting, carrying, pushing, pulling, unboxing, and assembling in a motion capture chamber. In some embodiments, the system 302 may similarly include the motion capture camera(s) control module 112 of FIG. 1 to control a set of motion capture cameras (e.g., eight Vicon® optical motion capture cameras 202 of FIG. 2) and the visible light imaging sensor(s) control module 114 of FIG. 1 to control a set of video cameras (e.g., four FLIR® red green and blue (RGB) video cameras 206a, 206b, 206c, and 206d of FIG. 2) positioned at selected locations of the motion capture chamber, as shown in FIG. 2. The system 302 may be a thin client device/terminal/application deployed within the computing system 300 and may have computation capabilities for preliminary processing of motion capture and video/image data obtained from various data capture devices associated with the motion capture chamber. The system 302 may transmit the obtained data, via a transceiver module similar to the transceiver module 116 of FIG. 1, to the server system 304 for performing data post processing functions described above with respect to the data post processing module 120 of FIG. 1. In one embodiment, the system 302 may be configured to make one or more an application programming interface (API) calls through an API interface. For example, the server system 304 may include an API gateway device (not shown) configured to receive and process API calls from various connected computing devices deployed within the system 300 (e.g., an operating system, a library, a device driver, an API, an application program, software or other module) including the data acquisition and processing system 302. Such an API gateway device may specify one or more functions, methods, classes, objects, protocols, data structures, formats and/or other features of the server system 304 that may be used by the system 302. For example, the API interface may define at least one calling convention that specifies how a function associated with the server system 304 receives data and parameters from a requesting device/system and how the function returns a result to the requesting device/system. According to one embodiment, in response to detecting that the system 302 makes an API call through the API interface to access and utilize the features of the server system 304 that are specified by the API interface, the server system 304 may return a value through the API interface to the system 302. It should be appreciated that the server system 304 may include additional functions, methods, classes, data structures, and/or other features that are not specified through the API interface and are not available to a requesting computing device.

The data acquisition and processing system 302 may also be configured to communicate and sync collected data, the detected location of each data capture device, and other parameters (e.g., calibration data of each data capture device) through wireless signals. For example, various modules of the system 302 may be configured to allow data to be uploaded to each other, the server system 304, and/or a cloud storage location via a corresponding transceiver module of the system 302. According to one embodiment, the system 302 may be configured to utilize a communication protocol such that all connected data capture devices are configured to geospatially aware of one another, and the server system 304 may monitor and track the locations of each of the plurality of data capture devices in real-time, thereby enabling data processing that is simpler, faster, and requires less user input. Additionally, each data capture device associated with the system 302 may be configured to transfer captured data during its recording session to free up storage space on itself and the local storage of the system 302 (e.g., memory 122 of FIG. 1), thereby enabling continuous recording.

The server system 304, which may be Cloud-based or an on-site server, provides functionalities for any connected devices such as sharing data or provisioning resources among multiple client devices, or performing computations for each connected client device. The term "server" generally refers to a computing device or system, including processing hardware and process space(s), an associated storage medium such as a memory device or database, and, in some instances, at least one database application as is well known in the art. It should also be understood that "server system" and "server" are often used interchangeably herein.

The communication network 308 may generally include a geographically distributed collection of computing devices or data points interconnected by communication links and segments for transporting signals and data therebetween. The protocol(s) 306 may generally include a set of rules defining how computing devices and networks may interact with each other, such as frame relay, Internet protocol (IP), transmission control protocol (TCP), user datagram protocol (UDP), hypertext transfer protocol (HTTP). It should be appreciated that the computing system 300 of the present disclosure may use any suitable communication network, ranging from local area networks (LANs), wide area networks (WANs), cellular networks, to overlay networks and software-defined networks (SDNs), a packet data network (e.g., the Internet), mobile telephone networks (e.g., cellular networks, such as 4G or 5G), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), Bluetooth, Near Field Communication (NFC), or any other suitable network.

If the computing system 300 is based on a Cloud-based computing architecture, the server system 304 may be configured to provide various Cloud computing services using shared resources. Cloud computing may generally include Internet-based computing in which computing resources are dynamically provisioned and allocated to each connected computing device or other devices on-demand, from a collection of resources available via the network or the Cloud. Cloud computing resources may include any type of resource, such as computing, storage, and networking. For instance, resources may include service devices (firewalls, deep packet inspectors, traffic monitors, load balancers, etc.), computing/processing devices (servers, CPUs, GPUs, random access memory, caches, etc.), and storage devices (e.g., network attached storages, storage area network devices, hard disk drives, solid-state devices, etc.). In addition, such resources may be used to support virtual networks, virtual machines, databases, applications, etc. The term "database," as used herein, may refer to a database (e.g., relational database management system (RDBMS) or structured query language (SQL) database), or may refer to any other data structure, such as, for example a comma separated values (CSV), tab-separated values (TSV), JavaScript Object Notation (JSON), eXtendible markup language (XML), TEXT (TXT) file, flat file, spreadsheet file, and/or any other widely used or proprietary format. In some embodiments, one or more of the databases or data sources may be implemented using one of relational databases, flat file databases, entity-relationship databases, object-oriented databases, hierarchical databases, network databases, NoSQL databases, and/or record-based databases.

Cloud computing resources accessible via any suitable communication network (e.g., Internet) may include a private Cloud, a public Cloud, and/or a hybrid Cloud. Here, a private Cloud may be a Cloud infrastructure operated by an enterprise for use by the enterprise, while a public Cloud may refer to a Cloud infrastructure that provides services and resources over a network for public use. In a hybrid Cloud computing environment which uses a mix of on-premises, private Cloud and third-party, public Cloud services with orchestration between the two platforms, data and applications may move between private and public Clouds for greater flexibility and more deployment options. Some example public Cloud service providers may include Amazon (e.g., Amazon Web Services® (AWS)), IBM (e.g., IBM Cloud), Google (e.g., Google Cloud Platform), and Microsoft (e.g., Microsoft Azure®). These providers provide Cloud services using computing and storage infrastructures at their respective data centers and access thereto is generally available via the Internet. Some Cloud service providers (e.g., Amazon AWS Direct Connect and Microsoft Azure ExpressRoute) may offer direct connect services and such connections typically require users to purchase or lease a private connection to a peering point offered by these Cloud providers.

The server system 304 (e.g., Cloud-based or an on-site server) of the present disclosure may be configured to connect with various data sources or services 306a, 306b, 306c, . . . 306n. In one embodiment, the server system 304 may be configured to generate a list of likely root-causes for identified high ergonomics risks that may be selected from the thousands of ergonomics assessments performed by ergonomics experts. One of the data sources or services 306a, 306b, 306c, . . . 306n may comprise a database of risk control options to use in job assessment reports provided during consulting projects over the past several decades. This database of ergonomic risk controls may be used to identify potential controls associated with each specific root cause identified. For another example, one of the data sources or services 306a, 306b, 306c, . . . 306n may comprise an artificial intelligence based diagnostic system or an expert or knowledge based diagnostic or evaluation system for providing or optimizing recommendations that may include text, audio, video, and other rich media explanations.

In accordance with further aspects of the present disclosure, to increase the visual diversity of the dataset, participants may be selected from different genders and with a diverse range of body shapes. In some example studies, each participant was asked to wear his or her own clothing but was provided with different headwear and personal protective equipment (PPE) gloves to mimic the typical worker appearance commonly observed in labor-intensive industries such as manufacturing and construction. The different combinations of hats and gloves may modify each participant's appearance throughout the motion capture session and increase the appearance diversity in the collected dataset.

Figures 4, 5:
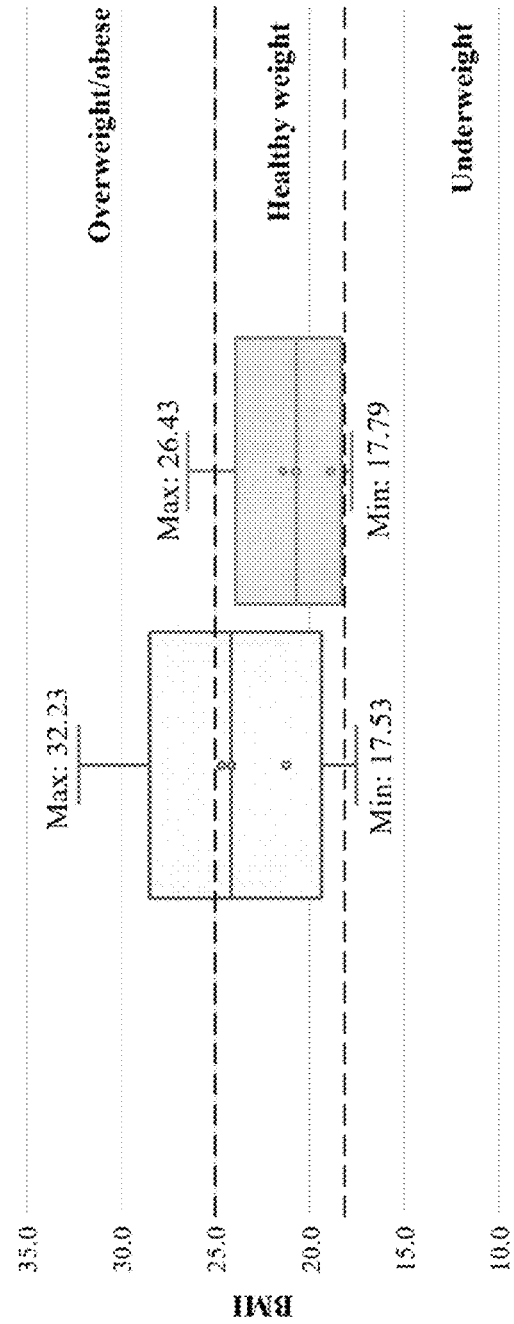
FIG. 4 illustrates body mass index (BMI) and BMI category of participants of an example study, according to an exemplary aspect of the present disclosure.
FIG. 5 illustrates a visualization of the BMI and corresponding classification for the participants of the example study of FIG. 4, according to an exemplary aspect of the present disclosure.

In one study, a group of five men and five women were recruited for data collection purposes. Within each gender group, there is a diverse representation of different body shapes: one underweight, three healthy weight, and one overweight or obese participant. The body shape classification has been determined using the Body Mass Index (BMI) following Centers for Disease Control and Prevention guidelines (CDC 2022). A comprehensive list of each participant's BMI is presented in FIG. 4, and its distribution is visualized in FIG. 5.

Figure 6E:
FIGS. 6(B), 6(C), 6(D), and 6(E) illustrate participants wearing various disposable gloves, according to an exemplary aspect of the present disclosure.
Figure 6D:
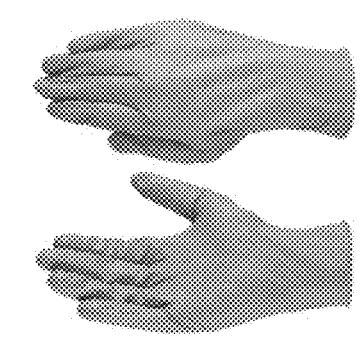
Figure 6C:
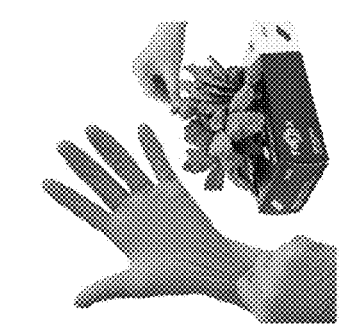
Figure 6B:
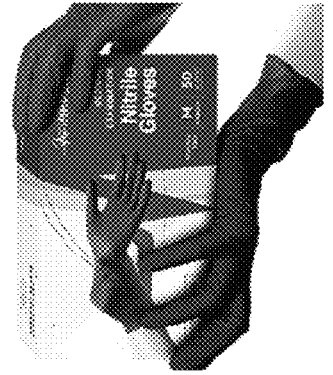
Figure 6A:
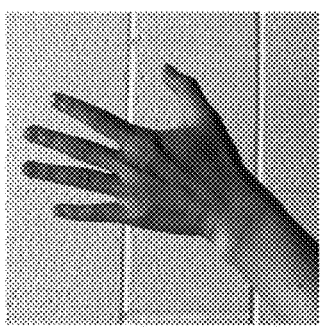
FIG. 6(A) illustrates a bare hand of a participant with no glove, according to an exemplary aspect of the present disclosure.
Figure 6J:
FIGS. 6(F), 6(G), 6(H), 6(I), and 6(J) illustrate work gloves of different colors and patterns, according to an exemplary aspect of the present disclosure.
Figure 6I:
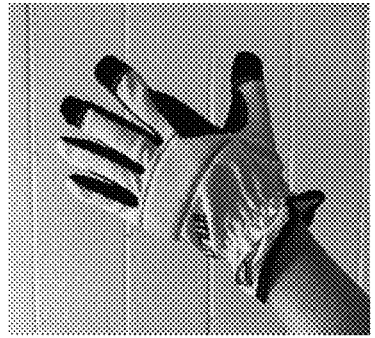
Figure 6H:
Figure 6G:
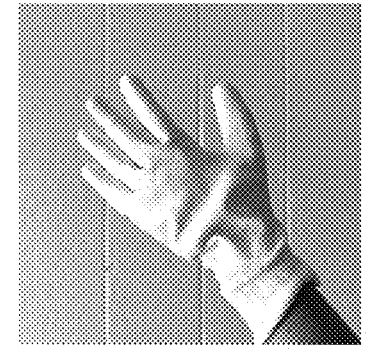
Figure 6F:

To further increase appearance diversity, the participants may be provided with various types of PPE gloves and hats. For example, FIG. 6(A) illustrates a bare hand of a participant with no glove, and the participants may be instructed to change into different combinations of hats and gloves between tasks. The PPE gloves may include four disposable gloves, as shown in FIGS. 6(B) (disposable gloves in dark blue), 6(C) (disposable gloves in blue), 6(D) (disposable gloves in orange), and 6(E) (clear disposable gloves), and five work gloves of different colors and pattern, as shown in FIGS. 6(F) (grey), 6(G) (white), 6(H) (black and white), 6(I) (yellow), and 6(J) (red). Such PPE gloves are commonly worn during manual labor work in industries like manufacturing and construction. For the hat selection, one protective hard hat, as shown in FIG. 7(A), and eight baseball caps of varying colors and design patterns may be selected. For example, FIG. 7(B) shows a baseball cap in green camo, FIG. 7(C) shows a baseball cap in blue denim, FIG. 7(D) shows a pink baseball cap with a small logo, FIG. 7(E) shows a brown baseball cap with a small logo, FIG. 7(F) shows a black baseball cap with letters, FIG. 7(G) shows a black baseball cap with a big logo, FIG. 7(H) shows a white baseball cap with a big logo, and FIG. 7(I) shows a brimless green hat. The diverse appearance of all the participants can help subsequent trained human pose estimation models to better adapt to different real-world worker appearances.

In one aspect, before the start of each motion capture session, a number of ergonomic optical reflective markers may be positioned on each participant. In one implementation, a total number of 49 reflective markers strategically positioned on key body surface locations of each participant, as respectively shown in FIGS. 8(A) and 8(B). According to one embodiment, at least a portion of the data acquisition devices (e.g., motion capture cameras 202 of FIG. 2) placed in the motion capture chamber may be equipped with an infrared strobe, which makes corresponding reflective optical markers emit infrared light. The motion capture camera(s) control module 112 of FIG. 1 may be configured to control these motion capture cameras to record the trajectories of the markers via the emitted light from each marker. Marker trajectories may be recorded and saved on the local memory of each camera and/or memory 122 of the system 106 of FIG. 1. In another embodiment, marker trajectories may transmitted and synced at a storage device or system associated with the server system 304 of FIG. 3. In some implementations, calibration of all data acquisition devices (e.g., all optional motion capture cameras and RGB video cameras of FIG. 2) may be performed before each session, and the settings, such as infrared strobe intensity and the threshold for centroid fitting, may be determined for optimal marker visibility and noise reduction. The following Table 1 shows a list of all surface maker locations.

TABLE 1

| No. | Joint ID | Joint Name | Location |
|---|---|---|---|
| 1 | HDTP | Head top | Head |
| 2 | REAR | Right ear | Head |
| 3 | LEAR | Left ear | Head |
| 4 | MDFH | Middle forehead | Head |
| 5 | C7 | Spine of the 7th cervical vertebra (C7) | Torso |
| 6 | C7_d | C7 down | Torso |
| 7 | SS | Suprasternal notch | Torso |
| 8 | T8 | Spine of the 8th thoracic vertebra | Torso |
| 9 | XP | Xiphoid process | Torso |
| 10 | RPSIS | Right posterior superior iliac spine | Pelvis |
| 11 | RASIS | Right anterior superior iliac spine | Pelvis |
| 12 | LPSIS | Left posterior superior iliac spine | Pelvis |
| 13 | LASIS | Left anterior superior iliac spine | Pelvis |
| 14 | RAP | Right acromion process | Shoulder |
| 15 | RAP_b | Back of right shoulder | Shoulder |
| 16 | RAP_f | Front of right shoulder | Shoulder |
| 17 | LAP | Left acromion process | Shoulder |
| 18 | LAP_b | Back of left shoulder | Shoulder |
| 19 | LAP_f | Front of left shoulder | Shoulder |
| 20 | RLE | Right lateral humeral epicondyle | Elbow |
| 21 | RME | Right medial humeral epicondyle | Elbow |
| 22 | LLE | Left lateral humeral epicondyle | Elbow |
| 23 | LME | Left medial humeral epicondyle | Elbow |
| 24 | RRS | Right radial styloid process | Wrist |
| 25 | RUS | Right ulnar styloid process | Wrist |
| 26 | LRS | Left radial styloid process | Wrist |
| 27 | LUS | Left ulnar styloid process | Wrist |
| 28 | RMCP2 | Right 2nd metacarpal phalangeal joint | Hand |
| 29 | RMCP5 | Right 5th metacarpal phalangeal joint | Hand |
| 30 | LMCP2 | Left 2nd metacarpal phalangeal joint | Hand |
| 31 | LMCP5 | Left 5th metacarpal phalangeal joint | Hand |
| 32 | RIC | Right peak of the iliac crest | Thigh |
| 33 | RGT | Right greater trochanter | Thigh |
| 34 | LIC | Left peak of the iliac crest | Thigh |
| 35 | LGT | Left greater trochanter | Thigh |
| 36 | RMFC | Right medial femoral condyle | Knee |
| 37 | RLFC | Right lateral femoral condyle | Knee |
| 38 | LMFC | Left medial femoral condyle | Knee |
| 39 | LLFC | Left lateral femoral condyle | Knee |
| 40 | RMM | Right medial malleolus | Ankle |
| 41 | RLM | Right lateral malleolus | Ankle |
| 42 | LMM | Left medial malleolus | Ankle |
| 43 | LLM | Left lateral malleolus | Ankle |
| 44 | RMTP1 | Right 1st metatarsophalangeal joint | Foot |
| 45 | RMTP5 | Right 5th metatarsophalangeal joint | Foot |
| 46 | LMTP1 | Left 1st metatarsophalangeal joint | Foot |
| 47 | LMTP5 | Left 5th metatarsophalangeal joint | Foot |
| 48 | RHEEL | Right heel | Foot |
| 49 | LHEEL | Left heel | Foot |

The marker locations may be selected to ensure sufficient information are captured for calculating all ergonomic angles of interest in an industrial ergonomic context. For example, as shown in FIG. 9, the marker set of the present disclosure may be configured to encompass a more comprehensive human pose representation compared to the simplified human skeleton used in existing open-source datasets. The expanded marker set may incorporate sufficient ergonomic keypoints essential for computing more intricate joint angles. For example, with respect to a participant's shoulder 902, the angles of interest in industrial ergonomics 904 may include flexion/extension, horizontal abduction/adduction, and rotation. Flexion movements refer to the movement of humerus straight anteriorly, and extension includes the movement of humerus straight posteriorly. Abduction movements include upward lateral movements of humerus out to the side, away from the body, in the plane of the scapula. Adduction movements include downward movements of humerus medially toward the body from abduction, in the plane of the scapula. Rotation movements may include external and internal rotations. External rotation refers to the movement of humerus laterally around its long axis away from the midline. Internal rotation refers to the movement of humerus medially around its long axis toward the midline. For another example, with respect to wrist 906, the angles of interest in industrial ergonomics 908 may include flexion/extension, deviation (radial and ulnar deviations), and rotation. As will be described fully below, detailed calculation of each ergonomic angle of interest outlined in FIG. 9 may be carried out based at least upon the positional data obtained from the aforementioned ergonomic markers. The validity of these angle calculation results has been verified by ergonomic experts using range of motion trials. These derived detailed joint angles offer ergonomic experts a more holistic insight into the ergonomic risks associated with each motion.

According to important aspects of the present disclosure, the following formulas may be used for joint location and angle calculations.

The midpoint formula, denoted by Midpoint ($P_1$, $P_2$, ..., $P_n$), calculates the center point of two or more 3D points. Specifically, it performs the following operation:

$$\text{Midpoint}(P_1, P_2, \ldots, P_n) = \frac{P_1 + P_2 + \ldots + P_n}{n} = \left( \frac{x_1 + x_2 + \ldots + x_n}{n}, \frac{y_1 + y_2 + \ldots + y_n}{n}, \frac{z_1 + z_2 + \ldots + z_n}{n} \right)$$

where ($x_i$, $y_i$, $Z_i$) is the 3D coordinate of $P_i$.

The translate formula, denoted by Translate(P, V, d), translates 3D point P in the direction of 3D vector V by scaler distance d:

Translate (P, V, d)=P+V·d.

The plane normal formula, denoted by $\text{Plane}_{norm}(V_1, V_2)$, finds the normal vector that is orthogonal to the plane created by 3D vectors $V_1$ and $V_2$:

$$\text{Plane}_{norm}(V_1, V_2) = \frac{V_1 \times V_2}{\|V_1 \times V_2\|}.$$

Projection formula, denoted by Project(V, $\hat{N}$), projects a vector V onto a plane with the normal unit vector N, forming a new 3D vector:

Project(V, $\hat{N}$)=V−(V·$\hat{N}$)·$\hat{N}$.

The vector angle formula, denoted by Angle($V_1$, $V_2$, $V_{dir}$), calculates the angle between 3D vector $V_1$ and $V_2$. An optional direction vector $V_{dir}$, in the same 3D plane with both $V_1$ and $V_2$ and orthogonal to $V_2$, is used to determine the sign of the angle:

$$\text{Angle}(V_1, V_2) = \arccos\left( \frac{V_1 \cdot V_2}{\|V_1 \cdot V_2\|} \right);$$

$$\text{Angle}(V_1, V_2, V_{dir}) = \arccos\left( \frac{V_1 \cdot V_2}{\|V_1 \cdot V_2\|} \right) * \text{sign}\left( \frac{\pi}{2} - \arccos\left( \frac{V_1 \cdot V_{dir}}{\|V_1 \cdot V_{idr}\|} \right) \right).$$

The rotation angle formula, denoted by Rot_angle($P_1$, $P_2$, $P_3$, $P_4$), calculates the rotation angle between 3D vectors $V_{(P1,P2)}$ and $V_{(P3,P4)}$:

$$\hat{N}_1 = \text{Plane}_{norm}\left( V_{(P_1,P_2)}, V_{(P_1,Midpoint(P_3,P_4))} \right);$$

$$\hat{N}_2 = \text{Plane}_{norm}\left( V_{(P_3,P_4)}, V_{(P_3,Midpoint(P_1,P_2))} \right);$$

$$\text{Rot\_angle}(P_1, P_2, P_3, P_4) = \arccos\left(\frac{\hat{N}_1 \cdot \hat{N}_2}{\|\hat{N}_1 \cdot \hat{N}_2\|}\right) * \text{sign}(V_{(P_1,P_3)} \cdot \hat{N}_2).$$

The joint center calculations may be carried out for a number of upper body joints using the following formulas:
  HEAD=Midpoint (LEAR, REAR);
  THORAX=SS;
  RSHOULDER=Midpoint (RAPf, RAPb);
  LSHOULDER=Midpoint (LAPf, LAPp);
  RELBOW=Midpoint (RME, RLE);
  LELBOW=Midpoint (LME, LLE);
  RWRIST=Midpoint(RRS, RUS);
  LWRIST=Midpoint(LRS, LUS);
    RHAND=Midpoint(RMCP2, RMCP5);
    LHAND=Midpoint(LMCP2, LMCP5).

The joint center calculations may be carried out for a number of lower body joints using the following formulas:
  PELVIS=Midpoint(RASIS, LASIS, RPSIS, LPSIS);
  RHIP=Translate(RGT, V(RASIS,LASIS), 2 inch);
  LHIP=Translate(LGT, V(LASIS,RASIS), 2 inch);
  RKNEE=Midpoint(RLFC, RMFC);
  LKNEE=Midpoint(LLFC, LMFC);
  RANKLE=Midpoint (RMM, RLM);
  LANKLE=Midpoint(LMM, LLM);
  RFOOT=Midpoint(RMTP1, RMTP5);
  LFOOT=Midpoint(LMTP1, LMTP5).

Figure 8B:
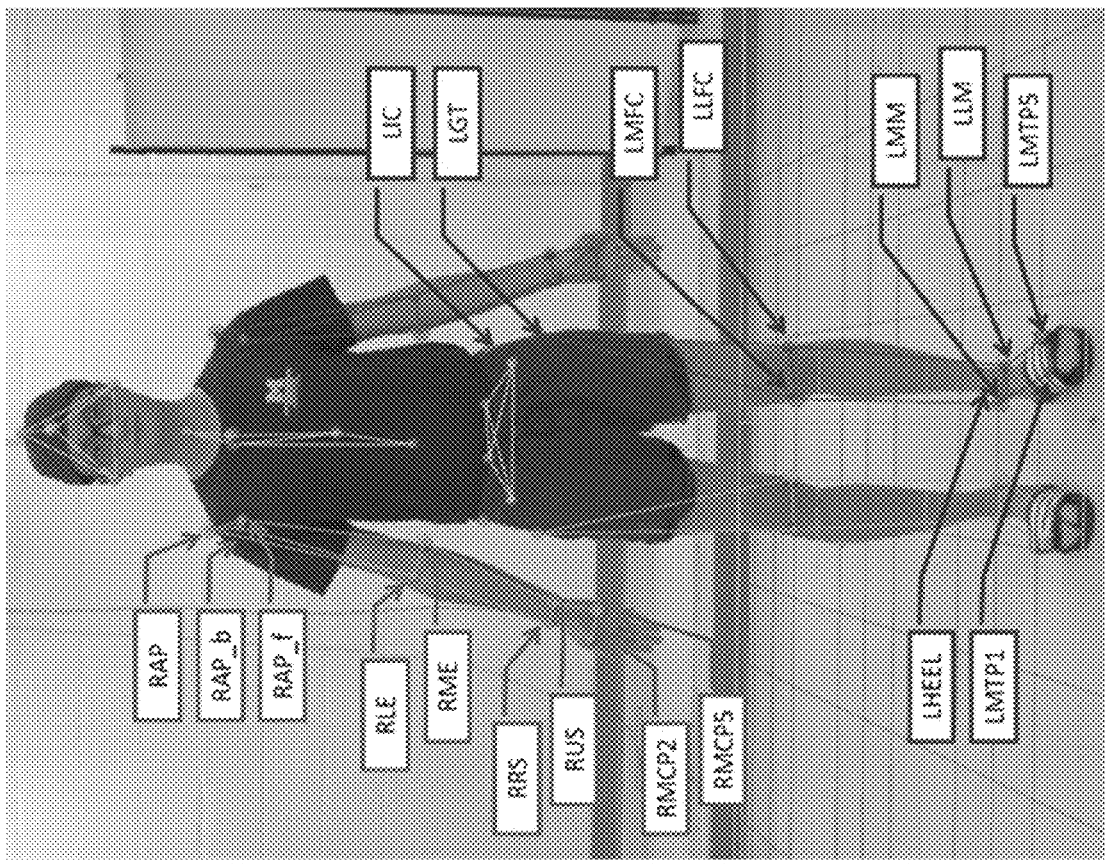
FIGS. 8(A) and 8(B) illustrate placements and locations of a plurality reflection marker on a subject, according to an exemplary aspect of the present disclosure.
Figure 8A:
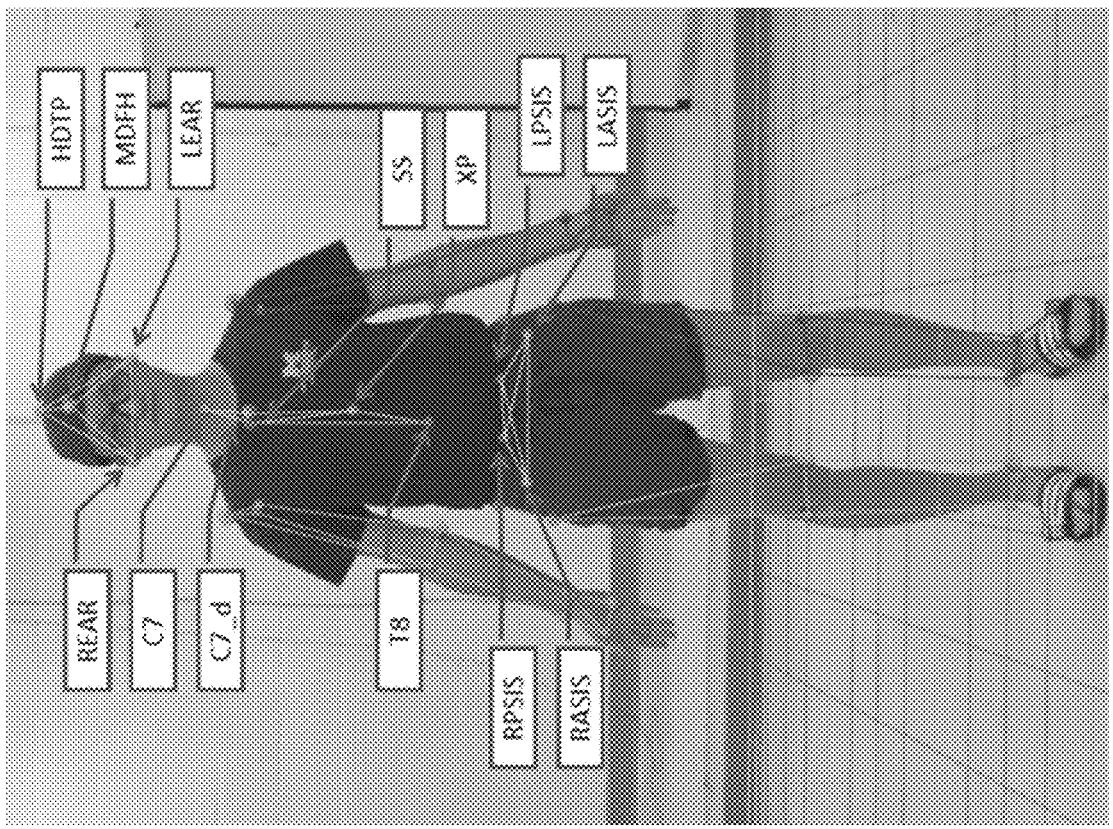
Figure 10A:
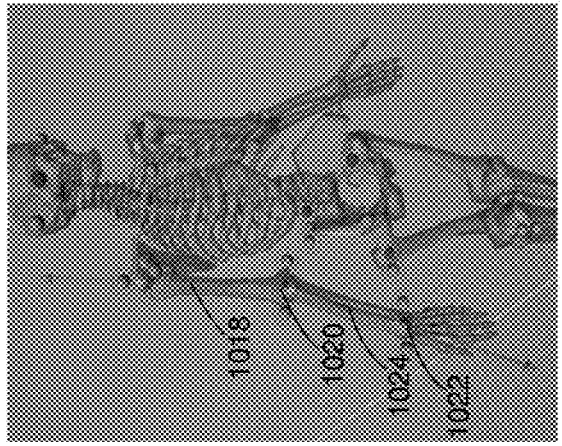
FIG. 10(A) is a diagram for segment coordinate definitions and joint angle calculations for a neck, according to an exemplary aspect of the present disclosure.

In accordance with aspects of the present disclosure, neck flexion/extension, lateral bend, and rotation 910, as shown in FIG. 9, may be calculated from 8 markers in the custom marker set as shown in FIGS. 8(A) and 8(B) and Table 1 (i.e., HDTP, LEAR, REAR, C7, LAP, RAP, LPSIS, RPSIS). As illustrated in FIGS. 8(A) and 10(A), the center of the head is calculated as the center point 1002 between LEAR and REAR using: HEAD=Midpoint(LEAR, REAR). This point 1002 may be defined as the origin of the head segment. A coronal head segment plane is created using the left and right EAR as well as the HDTP marker. The X-axis 1004 of the head segment is defined as the vector perpendicular to the coronal plane pointing in the anterior direction:

$$V_{head\_X\_axis} = \text{Plane}_{norm}(V_{(HEAD,HDTP)}, V_{(HEAD,REAR)}).$$

The Y-axis 1006 is defined as the vector from the head center to the HDTP marker:

$$V_{head\_Y\_axis} = V_{(HEAD,HDTP)}.$$

The Z-axis 1008 is defined using the cross product of the other two axes:

$$V_{head\_Z\_axis} = \text{Plane}_{norm}(V_{head\_X\_axis}, V_{head\_Y\_axis}).$$

The back vector is defined from the C7 marker to the center of the PSIS markers:

$$V_{back} = V_{(C7, Midpoint(LPSIS,RPSIS))}.$$

For angle calculation, the neck flexion/extension can be calculated by projecting the back vector onto the X-Y plane of the head coordinate system:

$$\hat{N}_{head\_XY\_plane} = \text{Plane}_{norm}(V_{head\_X\_axis}, V_{head\_Y\_axis});$$

$$V_{back\_XY\_project} = \text{Project}(V_{back}, \hat{N}_{head\_XY\_plane});$$

Neck flexion=Angle($V_{back\_XY\_project}, V_{head\_Y\_axis}$, $V_{head\_X\_axis}$).

Similarly, the lateral bend can be calculated as the Y-Z plane projection:

$$\hat{N}_{head\_YZ\_plane} = \text{Plane}_{norm}(V_{head\_Y\_axis}, V_{head\_Z\_axis});$$

$$V_{back\_YZ\_project} = \text{Project}(V_{back}, \hat{N}_{head\_YZ\_plane});$$

Neck lateral bend=Angle($V_{back\_YZ\_project}, V_{head\_Y\_axis}$, $V_{head\_Z\_axis}$).

The neck rotation angle is calculated as the projected rotation between the LEAR-REAR head direction vector and the LAP-RAP shoulder direction vector:

Neck rotation=$Rot$_angle(LEAR,REAR,LAP,RAP).

Figure 10B:
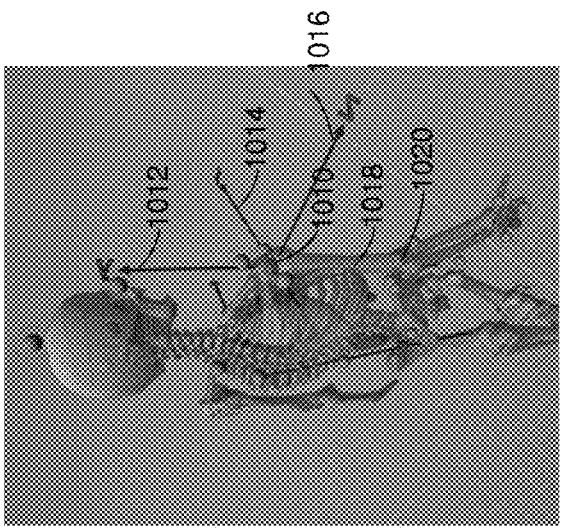
FIG. 10(B) is a diagram for segment coordinate definitions and joint angle calculations for a shoulder, according to an exemplary aspect of the present disclosure.

Shoulder flexion/extension, horizontal abduction/adduction, and rotation may be calculated from 9 markers in the custom marker set detailed in FIGS. 8(A) and 8(B) and Table 1 (i.e., RAP_b, RAP_f, SS, C7, C7_d, RME, RLE, LPSIS, RPSIS). As illustrated in FIG. 10(B), the shoulder joint center 1010, defined as the center of the RAP_b and RAP_f markers, is the origin of the shoulder coordinate system:

RSHOULDER=Midpoint(RAP_f,RAP_b).

The Y-axis 1012 of the shoulder coordinate system is defined as the superior vector PSIS-C7_d:

$$V_{shoulder\_Y\_axis} = V_{(PSIS,C7\_d)}.$$

A transverse shoulder plane is created perpendicular to the PSIS-C7_d vector and passes through the shoulder origin:

$$\hat{N}_{shoulder\_XZ\_plane} = V_{shoulder\_Y\_axis}.$$

The X-axis 1014 is defined as the C7_d-SS vector's projection on the transverse shoulder plane:

$$V_{shoulder\_X\_axis} = \text{Project}(V_{(C7\_d,SS)}, \hat{N}_{shoulder\_XZ\_plane}).$$

The Z-axis 1016 is defined using the cross product of the other two axes:

$$V_{shoulder\_Z\_axis} = \text{Plane}_{norm}(V_{shoulder\_Y\_axis}, V_{shoulder\_Z\_axis}).$$

Figure 10C:
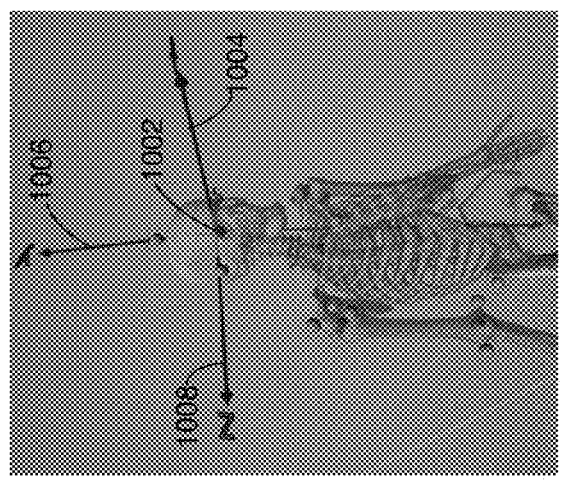
FIG. 10(C) is a diagram for segment coordinate definitions and joint angle calculations for an elbow, according to an exemplary aspect of the present disclosure.

The humerus vector 1018 is defined from the shoulder origin 1010 to the center of the elbow markers 1020 (i.e., RME, RLE), as illustrated in FIGS. 10(B) and 10(C):

RELBOW=Midpoint(RME,RLE);

$$V_{humerus} = V_{(RSHOULDER,RELBOW)}.$$

For angle calculation, the shoulder flexion/extension is calculated as the angle between the humerus vector 1018 and the back vector defined in the last section:

Shoulder flexion=Angle($V_{humerus}, V_{back}$).

The horizontal abduction/adduction is calculated by projecting the humerus vector 1018 onto the X-Z plane of the shoulder coordinate system:

$$V_{humerus\_XZ\_project} = \text{Project}(V_{humerus}, N_{shoulder\_XZ\_plane}$$

Abduction=Angle($V_{humerus\_XZ\_project}, V_{shoulder\_X\_axis}$, $V_{shoulder\_Z\_axis}$).

The shoulder rotation angle is calculated as the projected rotation between the RAP_b-RAP_f shoulder direction vector and the RME-RLE elbow direction vector:

Shoulder rotation=$Rot$_angle(RAP_b,RAP_f,RME, RLE).

In some embodiments, the present disclosure may identify elbow joints as hinges and only calculate one flexion angle. The elbow joint center 1020 is calculated as the center point of RLE and RME markers:

RELBOW=Midpoint(RME,RLE).

The wrist joint center 1022 is calculated as the center point between RRS and RUS:

RWRIST=Midpoint(RRS,RUS).

The forearm vector 1024 is defined from the elbow to the wrist joint center 1022:

$V_{forearm} = V_{(RELBOW,RWRIST)}$.

Elbow flexion can be simply calculated as the angle between the forearm and humerus vectors 1024, 1018:

Shoulder flexion=Angle($V_{humerus}, V_{forearm}$).

Figure 10D:
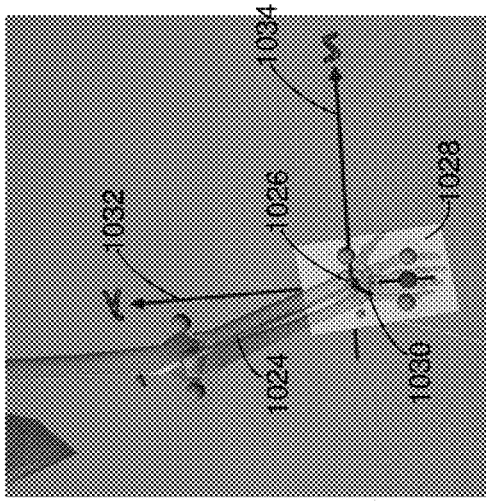
FIG. 10(D) is a diagram for segment coordinate definitions and joint angle calculations for a wrist, according to an exemplary aspect of the present disclosure.

Using the right wrist as an example, wrist flexion/extension, deviation, and rotation may be calculated from 6 markers in the custom marker set detailed in FIGS. 8(A) and 8(B) and Table 1 (i.e., RLE, RME, RRS, RUS, RMCP2, RMCP5). As illustrated in FIG. 10(D), the wrist joint center 1026 is defined as the origin of the hand segment. A coronal hand segment plane 1028 is created using the finger markers RMCP2 and RMCP5 as well as the wrist joint center. The X-axis 1030 of the hand segment is defined as the vector perpendicular to the coronal plane 1028 pointing in the anterior direction:

$V_{wrist\_X\_axis} = \hat{N}_{wrist\_YZ\_plane} = \text{Plane}_{norm}(V_{(RMCP2,RMCP5)}, V_{(RMCP2,RWRIST)})$.

The Y-axis 1032 is defined as the vector from the center of the finger markers to the wrist joint center 1026:

$V_{wrist\_Y\_axis} = V_{(Midpoint(RMCP2,RMCP5),RWRIST)}$.

The Z-axis 1034 is defined using the cross product of the other two axes:

$V_{wrist\_Z\_axis} = \hat{N}_{wrist\_XY\_plane} = \text{Plane}_{norm}(V_{wrist\_X\_axis}, V_{wrist\_Y\_axis})$.

For angle calculation, the wrist flexion/extension can be calculated by projecting the forearm vector 1024 onto the X-Y plane of the hand coordinate system:

$V_{forearm\_XY\_project} = \text{Project}(-V_{forearm}, \hat{N}_{wrist\_XY\_plane})$;

Wrist flexion=Angle($V_{forearm\_XY\_project}, V_{wrist\_Y\_axis}, V_{wrist\_X\_axis}$).

Similarly, the deviation can be calculated as the Y-Z plane projection:

$V_{forearm\_YZ\_project} = \text{Project}(-V_{forearm}, \hat{N}_{wrist\_YZ\_plane})$;

Wrist deviation=Angle($V_{forearm\_YZ\_project}, V_{wrist\_Y\_axis}, V_{wrist\_Z\_axis}$).

The wrist rotation angle is calculated as the projected rotation between the RLE-RME elbow direction vector and the RRS-RUS wrist direction vector:

Wrist rotation=Rot_angle(RLE,RME,RRS,RUS).

Figure 10E:
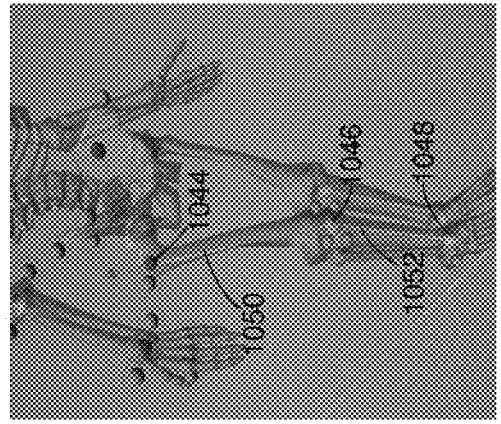
FIG. 10(E) is a diagram for segment coordinate definitions and joint angle calculations for a back, according to an exemplary aspect of the present disclosure.

Back flexion/extension, lateral flexion/extension, and rotation may be calculated from 3 markers in the custom marker set detailed in FIGS. 8(A) and 8(B) and Table 1 (i.e., C7, LPSIS, RPSIS) and a reference up direction in the world coordinate frame. As illustrated in FIG. 10(E), the origin of the back coordinate system 1036 is defined as the center point of the PSIS markers:

PSIS=Midpoint(RPSIS,LPSIS).

The Y-axis 1038 of the back coordinate system is defined as the reference up direction:

$V_{back\_Y\_axis} = (0,0,1)$.

A transverse plane is created perpendicular to the Y-axis 1038 and passes through the PSIS center:

$\hat{N}_{back\_XZ\_plane} = -V_{back\_Y\_axis}$.

The X-axis 1040 is defined as the PSIS-RPSIS vector's projection on the transverse plane:

$V_{back\_X\_axis} = \hat{N}_{back\_YZ\_plane} = \text{Project}(V_{(PSIS,RPSIS)}, \hat{N}_{back\_XZ\_plane})$ The Z-axis 1042 is defined using the cross product of the other two axes:

$V_{back\_Z\_axis} = \hat{N}_{back\_XY\_plane} = \text{Plane}_{norm}(V_{back\_X\_axis}, V_{back\_Y\_axis})$.

For angle calculation, the back flexion/extension can be calculated by projecting the back vector onto the X-Y plane of the back coordinate system:

$V_{back\_XY\_project} = \text{Project}(-V_{back}, \hat{N}_{back\_XY\_plane})$;

Back flexion=Angle($V_{back\_XY\_project}, V_{back\_Y\_axis}, V_{back\_X\_axis}$).

Similarly, the lateral flexion/extension can be calculated as the Y-Z plane projection:

$V_{back\_YZ\_project} = \text{Project}(-V_{back}, \hat{N}_{back\_YZ\_plane})$

Back lateral flexion=Angle ($V_{back\_YZ\_project}, V_{back\_Y\_axis}, V_{back\_Z\_axis}$)

The back rotation angle may be calculated as the projected rotation between the LPSIS-RPSIS waist direction vector and the LAP-RAP shoulder direction vector:

Back rotation=Rot_angle(LPSIS,RPSIS,LAP,RAP).

Figure 10F:
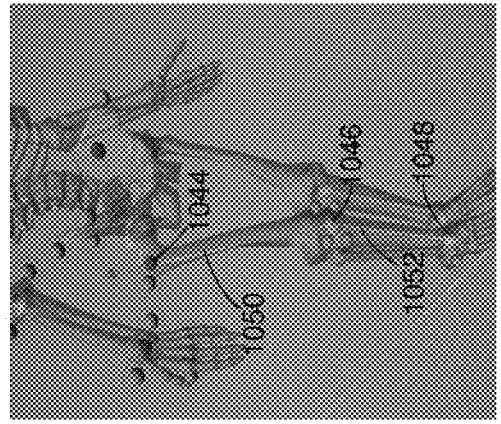
FIG. 10(F) is a diagram for segment coordinate definitions and joint angle calculations for a knee, according to an exemplary aspect of the present disclosure.

Similar to the elbow, in some embodiments, the present disclosure may identify knee joints as hinges and only calculate one flexion angle. As shown in FIG. 10(F), the hip joint center 1044 is calculated by translating the RGT marker 2 inches in the RASIS-LASIS vector direction:

RHIP=Translate(RGT,$V_{(RASIS,LASIS)}$,2inch).

The knee joint center 1046 is calculated as the center point between RLFC and RMFC markers:

RKNEE=Midpoint(RLFC,RMFC).

The ankle joint center 1048 is calculated as the center point between RMM and RLM markers:

RANKLE=Midpoint(RMM,RLM).

The femur vector 1050 is defined from the knee to the hip joint center:

$V_{femur} = V_{(RKNEE,RHIP)}$.

The tibia vector 1052 is defined from the knee to the ankle joint center:

$V_{tibia} = V_{(RKNEE,RANKLE)}$.

The elbow flexion may be calculated as the angle between the femur and tibia vectors 1050, 1052:

Elbow flexion=Angle($V_{femur}, V_{tibia}$).

After attaching the reflective markers, each participant may be asked to perform a number of custom-designed manual tasks, each lasting a selected time duration (e.g., three minutes). These manual tasks may be determined to simulate manual work commonly observed in labor-intensive industries like manufacturing, warehouse, and construction. For example, these tasks may include motions such as carrying, lifting, pushing, pulling, poking, assembling, and unboxing. Compared to the existing open-source datasets that focus on generic motions such as walking, eating, or talking on the phone, these custom-designed tasks of the present disclosure are more specialized for working activities. Accordingly, machine-learning models trained on such specialized datasets better adapt to real manual working scenarios in industrial settings.

For each motion capture task segment, participants were directed to start from an anatomically neutral position and repeat the designated motions in diverse ways over the selected time duration. An anatomical neutral position refers to a position of a participant's body when he or she is standing upright, facing forward, eyes focused on the distance, arms should be straight and by the sides with palms facing forward. Lower limbs together or slightly apart with feet flat on the floor and facing forward. Participants were instructed to vary their speed, exerted force, and utilize different movement patterns (e.g., changing between knee bending and back bending for lifting). They were also encouraged to move around within the capture area, performing their tasks at different locations and orientations. This approach enables the data acquisition and the dataset to capture global motion patterns, offering a more realistic representation of real work scenarios and expanding the camera viewpoint diversity. A detailed description of the designed example task motions 1-9 is provided as follows.

Figure 11A:
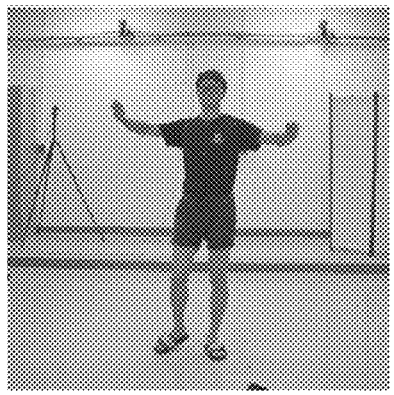
FIG. 11(A) illustrates a warm-up task, according to an exemplary aspect of the present disclosure.

Task #1—Warm-up: As shown in FIG. 11(A), participants were instructed to engage in a series of warm-up activities, including stretching, walking, jogging, jumping, as well as sitting down and standing up. This task was designed to capture general human motions and allow participants to bend each joint to their full range of motion. This allows subsequent trained human pose estimation models to learn the underlying skeleton kinematics relationships.

Figure 11B:
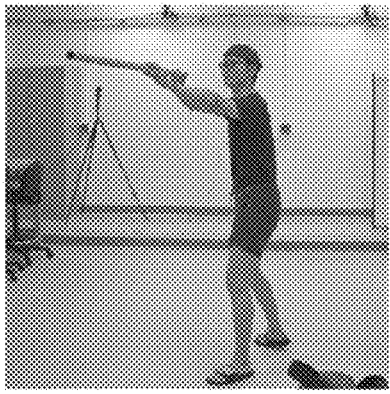
FIG. 11(B) illustrates a poke task, according to an exemplary aspect of the present disclosure.

Task #2—Poke: As shown in FIG. 11(B), participants were instructed to simulate a poking task commonly encountered in a factory setting. Each participant was provided with a 1.35 m long light pole and tasked with performing poking motions in various directions and manners. The motions include poking upwards, poking downwards, poking forward at waist height, poking forward at chest height, poking forward overhead. The participants were also asked to perform the motion from both the left and right sides of their bodies.

Figure 11C:
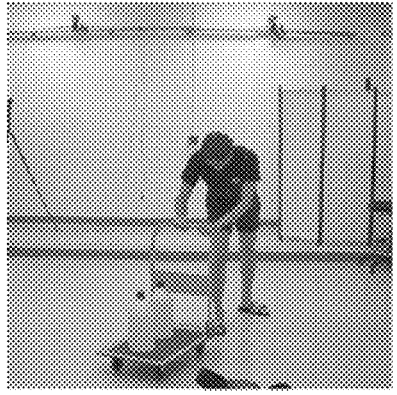
FIG. 11(C) illustrates a push/pull task, according to an exemplary aspect of the present disclosure.

Task #3—Push & pull cart: As shown in FIG. 11(C), participants were instructed to simulate a pushing and pulling task, replicating the actions required to maneuver a cart within an industrial environment. To increase motion diversity, participants were provided with weighted objects to adjust the cart weight. This allowed them to perform the pushing and pull motion at differing levels of resistance.

Figure 11D:
FIG. 11(D) illustrates a carry task, according to an exemplary aspect of the present disclosure.

Task #4—Carry: As shown in FIG. 11(D), in this task, participants were directed to carry objects horizontally between locations set at the same height, positioned roughly 2 meters apart. The objects provided for this task were deliberately selected to vary in weight and shape, prompting participants to use a diverse range of carrying motions. The participants were also encouraged to repeat the motions in different manners, allowing the dataset to capture a wider variety of carrying techniques.

Figure 11E:
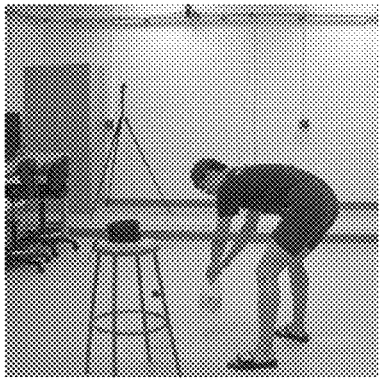
FIG. 11(E) illustrates a lift task, according to an exemplary aspect of the present disclosure.

Task #5—Lift: Similar to task #4, as shown in FIG. 11(E), participants were provided with objects of different weights and shapes but instructed to lift and lower them between ground level and waist height. This motion is an essential component of many manual labor tasks, such as bricklaying, and it often places significant stress on the lower back when not executed correctly.

Figure 11F:
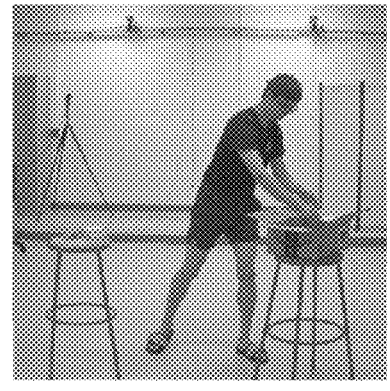
FIG. 11(F) illustrates an unbox task, according to an exemplary aspect of the present disclosure.

Task #6—Unbox: As shown in FIG. 11(F), participants were given a box containing objects of varying weights and shapes. They were instructed to unbox the contents, place them on a nearby surface, and subsequently repack and seal the box. Furthermore, participants were encouraged to perform this task at different speeds, adding a dynamic element to the captured data.

Figure 11G:
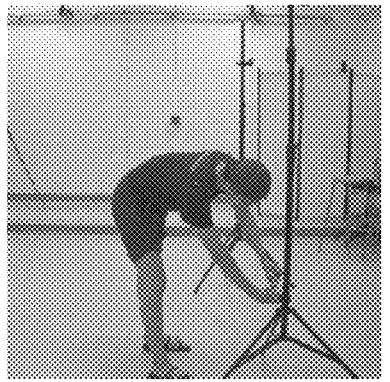
FIG. 11(G) illustrates an assemble task with back bending, according to an exemplary aspect of the present disclosure.

Task #7—Assemble with back bending: As shown in FIG. 11(G), participants were instructed to assemble a camera clamp mount positioned at knee height while bending their back. This task was purposefully designed to replicate scenarios where individuals work at lower heights, such as mounting car tires or laying brick foundations. This commonly observed posture often induces abnormal stress on the lower back muscles, which may contribute to the development of WMSDs in the long term.

Figure 11H:
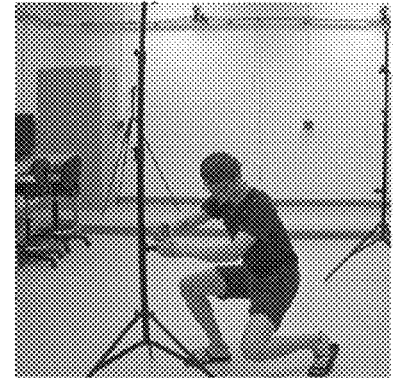
FIG. 11(H) illustrates an assemble task with knee bending, according to an exemplary aspect of the present disclosure.

Task #8—Assemble with knee bending: Similar to Task #7, as shown in FIG. 11(H), participants were instructed to assemble a camera clamp mount positioned at knee height, but instead using a knee bending posture. This posture is conducive to workers performing tasks at lower heights and alleviates stress on the lower back muscles.

Figure 11I:
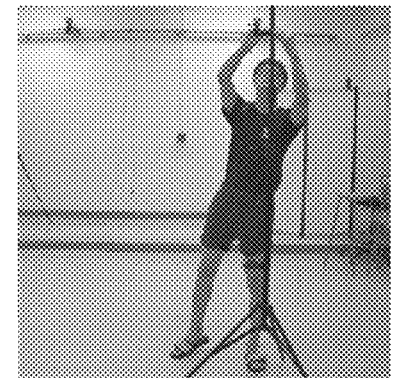
FIG. 11(I) illustrates an assemble overhead task, according to an exemplary aspect of the present disclosure.

Task #9—Assemble overhead: As shown in FIG. 11(I), participants were instructed to assemble a camera clamp mount positioned above their heads. This task is designed to replicate scenarios where workers are engaged in overhead tasks, such as installing a car sunroof or drilling on the roof. Working in elevated positions induces increased stress on the upper arms and neck and often involves torso twisting. Prolonged exposure to such conditions may contribute to the development of WMSDs.

After the motion capture session, the 3D positions of the reflective markers may be calculated using triangulation. In accordance with aspects of the present disclosure, it remains imperative to post-process the raw marker positions and convert them into labeled 3D and 2D human poses synced with the RGB video. In one embodiment, the data post-processing may include five steps. First, the markers may be auto-labeled using a custom labeling template (associating the markers defined in the labeling template with reconstructed markers displayed in 3D perspective view via the system 106 of FIG. 1 or system 302 of FIG. 3) and visually inspected for errors. Then, frames with occluded markers may be filled using temporal and positional information. Third, the marker positions may be smoothed to reduce high-frequency noise. Fourth, the labeled marker positions may be transformed into the camera coordinate frame, outputting 3D poses. Lastly, the 3D poses are projected onto the 2D camera image plane, resulting in 2D poses. Each step will be described fully below.

In one aspect, the first step of data post-processing (e.g., performed by the data post processing module 120 of the system 106 of FIG. 1 or the server system 304 of FIG. 3, depending upon specific system architecture and implementation) may include correctly labeling all the triangulated markers. According to one embodiment, a custom auto-labeling template may be built to automate this process using a range of motion trial from a specific participant. For example, the participant may be asked to systematically bend all body joints to their full extent in all degrees of freedom to establish the potential range of human motion. The resulting motion capture data may be manually labeled to construct a subject template, with which subsequent trials may be labeled automatically. In one aspect, it may be essential to visually inspect and rectify any mislabeling, which is especially common when markers are temporarily occluded from the motion capture cameras. This process may be performed manually frame-by-frame by cross-referencing the motion capture data with the RGB video.

During motion capture, certain reflective markers may be temporally occluded from the motion capture cameras, creating gaps in their trajectories. Such gaps can be filled using temporal information from an occluded marker (i.e., last frame of a marker position before occlusion and first frame after reappearance) and positional information from surrounding markers. In one embodiment, small gaps under 0.1 seconds may be filled using a cubic spline fill interpolation operation. For larger gaps, a rigid body fill may be implemented. This method utilizes three visible markers on the same rigid body to calculate the position of the occluded marker. When no suitable markers are available, the gap may be filled using a movement pattern of a nearby marker on the same body segment.

Next, the marker trajectories may be smoothed to remove high-frequency noises in the data. For example, a Woltring filter with a smoothing length of 0.1 seconds may be applied to the collected trajectories.

3D world-to-camera coordinate transformation may then be carried out to transform the global marker positions into the local coordinate system of the four RGB video cameras. Each camera's 3D position ($t_{3\times 1}$) and orientation ($R_{3\times 3}$) may be collected during the camera calibration procedure preceding every motion capture session. The local marker positions may be calculated using Eq. (1) as follows. The labeled 3D marker locations, expressed locally in each camera's coordinate system, may be the 3D human pose output of the motion capture dataset.

$$3D \text{ Pose} = \begin{pmatrix} X_{camera} \\ Y_{camera} \\ Z_{camera} \\ 1 \end{pmatrix} = \begin{pmatrix} R_{3\times 3} & t_{3\times 1} \\ 0_{3\times 1} & 1_{1\times 1} \end{pmatrix} \cdot \begin{pmatrix} X_{world} \\ Y_{world} \\ Z_{world} \\ 1 \end{pmatrix} \quad \text{Eq. (1)}$$

Thereafter, 2D camera projection and distortion may be performed to project the local 3D human pose into a corresponding 2D RGB video frame, generating the 2D human pose. Each camera's intrinsic parameters, including a focal length (f), a skew coefficient (k) (the number of pixels per unit length in each direction), a pixel aspect ratio (a) (a mathematical ratio that describes how the width of a pixel in a digital image compared to the height of that pixel), radical distortion parameters ($w_0$, $w_1$, $w_2$), and a principle point and distortion center ($u_{pp}$, $v_{pp}$) may be collected during the camera calibration procedure. The projected 2D pose may be calculated using Eq. (2) as follows.

$$\begin{pmatrix} u_{camera} \\ v_{camera} \\ 1 \end{pmatrix} = \begin{pmatrix} f & k & u_{pp} \\ 0 & f/a & v_{pp} \\ 0 & 0 & 1 \end{pmatrix} \cdot \begin{pmatrix} X_{camera} \\ Y_{camera} \\ Z_{camera} \end{pmatrix} \quad \text{Eq. (2)}$$

However, due to the distortion effect of the camera lens, the projected keypoints may not match the corresponding RGB video frame. The 2D human pose also needs to be distorted using an approximated radial distortion model described in Eqs. (3)-(6).

$$dp = \begin{pmatrix} du \\ dv \end{pmatrix} = \begin{pmatrix} u_{camera} - u_{pp} \\ a \cdot v_{camera} - v_{pp} \end{pmatrix} \quad \text{Eq. (3)}$$

$$r = \|dp\| \quad \text{Eq. (4)}$$

$$s = 1 + w_0 r^2 + w_1 r^4 + w_2 r^6 \quad \text{Eq. (5)}$$

$$2D \text{ Pose} = \begin{pmatrix} u_{camera\_distorted} \\ v_{camera\_distorted} \end{pmatrix} = \begin{pmatrix} du/s + u_{pp} \\ dv/(s \cdot a) + v_{pp} \end{pmatrix} \quad \text{Eq. (6)}$$

The resulting dataset comprises three main categories of data: a) 2D RGB videos, b) 2D human pose, and c) 3D human pose. In one study, for each of ten participants, nine 3-minute videos were recorded at 100 frames per second (fps) using four cameras. In total, the dataset accumulates 18 hours of video footage, equivalent to 6.48 million 2D video frames with the corresponding 2D and 3D human pose annotation, as shown in Table 2 below.

TABLE 2

| Participant # | Tasks | Average duration | Camera # | Fps (video & pose) | Video resolution | Total Hours | Frames |
|---|---|---|---|---|---|---|---|
| 10 | 9 | 3 min | 4 | 100 | 1920 × 1200 | 18 | 6.48 M |

In accordance with aspects of the present disclosure, the resulting motion capture dataset may be configured to train specialized human pose estimation models with an ergonomic focus, subsequently facilitating the development of accurate vision-based ergonomic risk assessment tools. For example, the custom set of a number of body surface keypoints (e.g., 49 reflective markers) captured in this dataset enhances the scope for possible joint angle calculations, encompassing intricate movements such as wrist rotations. The ergonomic angle of interest outlined in FIG. 9 can help ergonomic specialists evaluate the risk of WMSD associated with specific tasks. Moreover, the tailored motion capture tasks allow the dataset of the present disclosure to capture a more comprehensive representation of the postures and motions inherent in manual tasks, hence enabling the training of more accurate human pose estimation models better suited for industrial ergonomics. Overall, the collected dataset serves as an essential part in building autonomous solutions for assessing worker WMSDs risks in labor-intensive industries.

Figure 12:
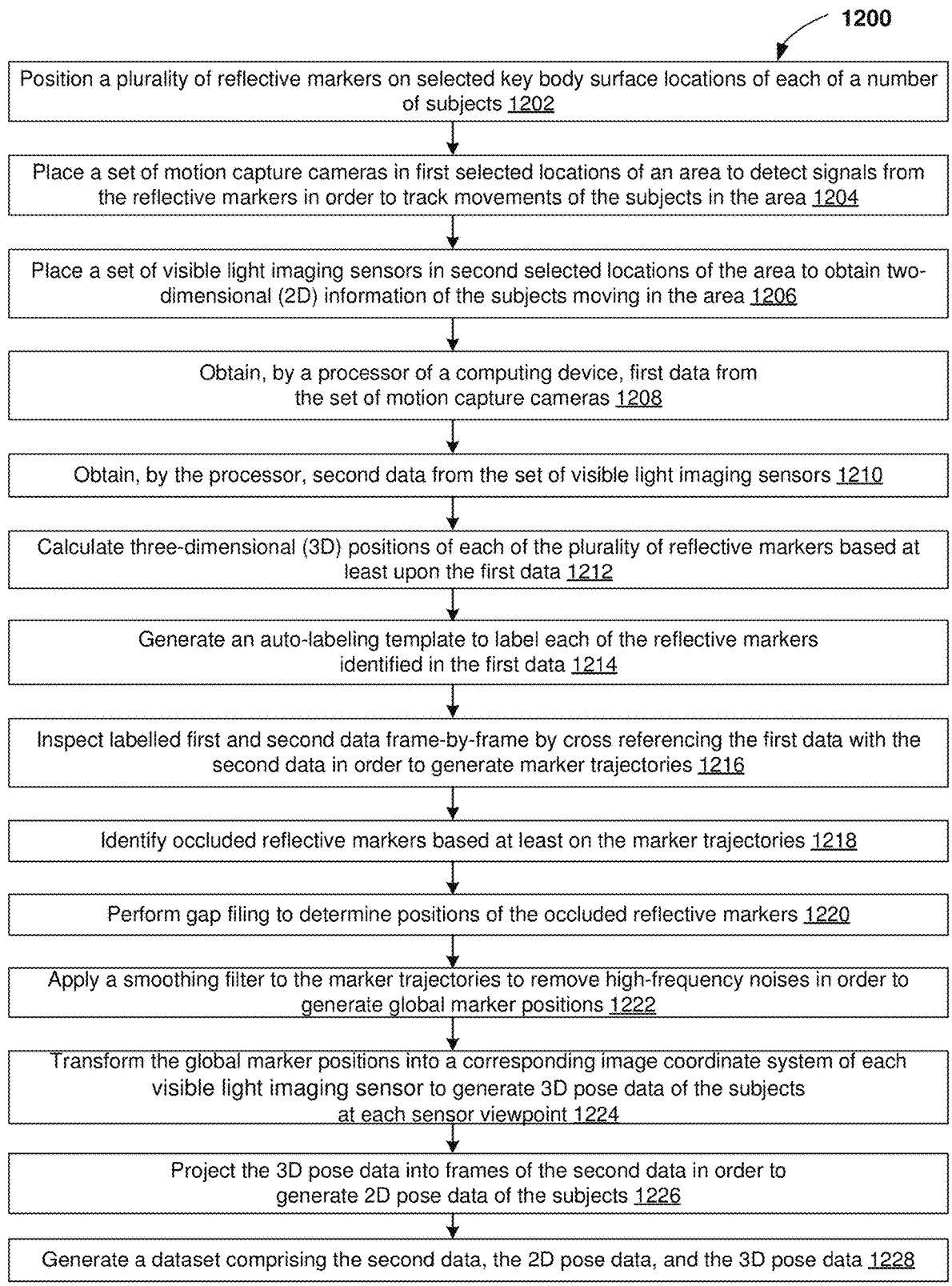
FIG. 12 illustrates a flowchart of a method carried out by the computing system of FIG. 1 for obtaining and generating motion capture datasets relating to various working activities for ergonomic risk assessment, according to an exemplary aspect of the present disclosure.

According to aspects of the present disclosure, FIG. 12 illustrates a flowchart of a method 1200 for obtaining and generating motion capture datasets relating to various working activities for ergonomic risk assessment. The method 1200 may comprise positioning (1202) a plurality of reflective markers on selected key body surface locations of each of a number of subjects; placing (1204) a set of motion capture cameras in first selected locations of an area to detect signals from the plurality of reflective markers in order to track movements of the number of subjects in the area; and placing (1206) a set of visible light imaging sensors in second selected locations of the area to obtain 2D information of the number of subjects moving in the area.

Further, the method 1200 may include obtaining (1208), by a processor of a computing device, first data from the set of motion capture cameras; obtaining (1210), by the processor, second data from the set of visible light imaging sensors; calculating (1212) 3D positions of each of the plurality of reflective markers based at least upon the first data; generating (1214) an auto-labeling template to label each of the plurality of reflective markers identified in the first data; and inspecting (1216) labelled first and second data frame-by-frame by cross referencing the first data with the second data in order to generate marker trajectories.

The method 1200 also includes identifying (1218) occluded reflective markers based at least on the marker trajectories; performing (1220) gap filing to determine positions of the occluded reflective markers; and applying (1222) a smoothing filter to the marker trajectories to remove high-frequency noises in order to generate global marker positions.

Subsequently, the method 1200 comprises transforming (1224) the global marker positions into a local coordinate system of the set of visible light imaging sensors to generate 3D pose data of the number of subjects; projecting (1226) the 3D pose data into frames of the second data in order to generate 2D pose data of the number of subjects; and generating (1228) a dataset comprising the second data, the 2D pose data, and the 3D pose data.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment or aspect, but other elements may be added and still form a construct within the scope of a claim. In contrast, the transitional phrase "consisting of" excludes any element, step, or ingredient not specified in a claim. This is consistent with the use of the term throughout the specification.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted to be prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A system, comprising:
a plurality of reflective markers positioned on selected key body surface locations of each of a number of subjects;
a set of motion capture cameras placed in first selected locations of an area to detect signals from the plurality of reflective markers to track movements of each subject in the area;
a set of visible light imaging sensors placed in second selected locations of the area to obtain two-dimensional (2D) information of the number of subjects moving in the area; and
a computing device, comprising:
a non-transitory computer-readable storage medium storing instructions; and
a processor coupled to the non-transitory computer-readable storage medium and configured to execute the instructions to:
obtain first data from the set of motion capture cameras,
obtain second data from the set of visible light imaging sensors,
calculate three-dimensional (3D) positions of each of the plurality of reflective markers based at least upon the first data,
generate an auto-labeling template to label each of the plurality of reflective markers identified in the first data,
inspect labelled first and second data frame-by-frame by cross referencing the first data with the second data to generate marker trajectories,
identify occluded reflective markers based at least on the marker trajectories,
perform gap filing to determine positions of the occluded reflective markers,
apply a smoothing filter to the marker trajectories to remove high-frequency noises to generate global marker positions,
transform the global marker positions into a corresponding image coordinate system of each visible light imaging sensor to generate 3D pose data of the number of subjects at each sensor viewpoint,
project the 3D pose data into frames of the second data to generate 2D pose data of the number of subjects, and
generate a dataset comprising the second data, the 2D pose data, and the 3D pose data.

2. The system of claim 1, wherein locations of the plurality of reflective markers are determined to capture pose information of a plurality of body portions of each of the number of subjects for calculating ergonomic angles of interest in an industrial ergonomic context, wherein the plurality of body portions include a neck portion, a shoulder portion, an elbow portion, a wrist potion, a back portion and a knee portion.

3. The system of claim 2, wherein the ergonomic angles of interest of the neck portion include neck flexion/extension, lateral bend, and rotation, the angles of interest of the shoulder portion include shoulder flexion/extension, horizontal abduction/adduction, and rotation, the angles of interest of the elbow portion include a first flexion angle, the angles of interest of the wrist portion include wrist flexion/extension, deviation, and rotation, the angles of interest of the back portion include back flexion/extension, lateral flexion/extension, and rotation, and the angles of interest of the knee portion include a second flexion angle.

4. The system of claim 1, wherein the first and second data relate to motions of the number of subjects performing each of a plurality of working activities for a selected duration of time, wherein the plurality of working activities include a series of warm-up activities, poking, pushing/pulling a cart, carrying objects horizontally, lifting objects, unboxing boxes, assembling with back bending, assembling with knee bending, and assembling overhead.

5. The system of claim 1, wherein the processor of the computing device is configured to calculate the 3D positions of each reflective marker based at least upon the first data using triangulation.

6. The system of claim 1, wherein the processor of the computing device is configured to generate the auto-labeling template by at least recording motion capture data of one of the subjects bending all body joints to their full extent in all degrees of freedom.

7. The system of claim 1, wherein the processor of the computing device is configured to perform the gap filing to determine the positions of the occluded reflective markers by at least using temporal information from each occluded reflective marker and positional information from surrounding reflective markers.

8. The system of claim 1, wherein the processor of the computing device is further configured to execute the instructions to collect 3D positional data and orientation data of each visible light imaging sensor during a calibration procedure of the set of visible light imaging sensors preceding every motion capture session.

9. The system of claim 8, wherein the processor of the computing device is configured to transform the global marker positions into the local coordinate system of the set of visible light imaging sensors based at least upon the 3D positional data and orientation data of each visible light imaging sensor.

10. The system of claim 8, wherein the processor of the computing device is further configured to execute the instructions to collect a number of parameters relating to each visible light imaging sensor during the calibration procedure, the number of parameters including a focal length, a skew coefficient, a pixel aspect ratio, radical distortion parameters, and a principle point and distortion center, wherein the processor is configured to generate the 2D pose data based at least upon the number of parameters.

11. A computer-implemented method, comprising:
positioning a plurality of reflective markers on selected key body surface locations of each of a number of subjects;
placing a set of motion capture cameras in first selected locations of an area to detect signals from the plurality of reflective markers in order to track movements of each subject in the area;
placing a set of visible light imaging sensors in second selected locations of the area to obtain two-dimensional (2D) information of the number of subjects moving in the area;
obtaining, by a processor of a computing device, first data from the set of motion capture cameras;
obtaining, by the processor, second data from the set of visible light imaging sensors;
calculating three-dimensional (3D) positions of each of the plurality of reflective markers based at least upon the first data;
generating an auto-labeling template to label each of the plurality of reflective markers identified in the first data;
inspecting labelled first and second data frame-by-frame by cross referencing the first data with the second data in order to generate marker trajectories;
identifying occluded reflective markers based at least on the marker trajectories;
performing gap filing to determine positions of the occluded reflective markers;
applying a smoothing filter to the marker trajectories to remove high-frequency noises in order to generate global marker positions;
transforming the global marker positions into a corresponding image coordinate system of each visible light imaging sensor to generate 3D pose data of the number of subjects at each sensor viewpoint;
projecting the 3D pose data into frames of the second data in order to generate 2D pose data of the number of subjects; and
generating a dataset comprising the second data, the 2D pose data, and the 3D pose data.

12. The computer-implemented method of claim 11, further comprising determining locations of the plurality of reflective markers in order to capture pose information of a plurality of body portions of each of the number of subjects for calculating ergonomic angles of interest in an industrial ergonomic context, wherein the plurality of body portions include a neck portion, a shoulder portion, an elbow portion, a wrist potion, a back portion and a knee portion.

13. The computer-implemented method of claim 12, wherein the ergonomic angles of interest of the neck portion include neck flexion/extension, lateral bend, and rotation, the angles of interest of the shoulder portion include shoulder flexion/extension, horizontal abduction/adduction, and rotation, the angles of interest of the elbow portion include a first flexion angle, the angles of interest of the wrist portion include wrist flexion/extension, deviation, and rotation, the angles of interest of the back portion include back flexion/extension, lateral flexion/extension, and rotation, and the angles of interest of the knee portion include a second flexion angle.

14. The computer-implemented method of claim 11, wherein the first and second data relate to motions of the number of subjects performing each of a plurality of working activities for a selected duration of time, wherein the plurality of working activities include a series of warm-up activities, poking, pushing/pulling a cart, carrying objects horizontally, lifting objects, unboxing boxes, assembling with back bending, assembling with knee bending, and assembling overhead.

15. The computer-implemented method of claim 11, wherein the calculating the 3D positions of each reflective marker comprises triangulating the first data.

16. The computer-implemented method of claim 11, wherein the generating the auto-labeling template comprises recording motion capture data of one of the subjects bending all body joints to their full extent in all degrees of freedom.

17. The computer-implemented method of claim 11, wherein the performing the gap filing to determine the positions of the occluded reflective markers comprises using temporal information from each occluded reflective marker and positional information from surrounding reflective markers.

18. The computer-implemented method of claim 11, further comprising collecting 3D positional data and orientation data of each visible light imaging sensor during a calibration procedure of the set of visible light imaging sensors preceding every motion capture session.

19. The computer-implemented method of claim 18, wherein the transforming the global marker positions into the local coordinate system of the set of visible light imaging sensors is based at least upon the 3D positional data and orientation data of each visible light imaging sensor.

20. The computer-implemented method of claim 18, further comprising collecting a number of parameters relating to each visible light imaging sensor during the calibration procedure, the number of parameters including a focal length, a skew coefficient, a pixel aspect ratio, radical distortion parameters, and a principle point and distortion center, wherein the generating the 2D pose data is based at least upon the number of parameters.

* * * * *